US006593667B1

(12) United States Patent
Onodera et al.

(10) Patent No.: US 6,593,667 B1
(45) Date of Patent: Jul. 15, 2003

(54) CAR-MOUNTED INPUT DEVICE

(75) Inventors: Mikio Onodera, Miyagi-ken (JP); Hidetaka Numata, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 24 days.

(21) Appl. No.: 09/614,814

(22) Filed: Jul. 12, 2000

(30) Foreign Application Priority Data

Jul. 14, 1999 (JP) .......................................... 11-200949
Jul. 14, 1999 (JP) .......................................... 11-200952
Mar. 10, 2000 (JP) ...................................... 2000-067569

(51) Int. Cl.$^7$ .................................................. B60L 1/00
(52) U.S. Cl. ....................... 307/10.1; 307/9.1; 345/161; 345/168; 345/184
(58) Field of Search ................................ 307/10.1, 9.1; 345/161, 168; 318/560

(56) References Cited

U.S. PATENT DOCUMENTS 5,515,345 A 5/1996 Barreira et al. ................ 369/6
5,796,927 A * 8/1998 Hegg .......................... 395/95
5,828,813 A * 10/1998 Ohm ........................... 395/95
5,945,646 A 8/1999 Miller et al. ................... 200/5
5,952,730 A 9/1999 Haller et al.
6,154,201 A * 11/2000 Levin et al. ................ 345/184
6,184,868 B1 * 3/2001 Shahoian et al. ........... 345/161
6,246,129 B1 * 6/2001 Schaefer .................... 307/10.1

* cited by examiner

*Primary Examiner*—Brian Sircus
*Assistant Examiner*—Robert L Deberadinis
(74) *Attorney, Agent, or Firm*—Brinks Hofer Gilson & Lione

(57) ABSTRACT

A ROM provided in a computer stores tables showing the relationships between the direction and amount of operation of a manual operating section, and external force to be applied from electric motors. A CPU determines the direction and amount of external force to be applied to the manual operating section based on positional information output from encoders and the tables, and drives the electric motors via a motor driver. The operator can feel the resistance produced thereby at the manual operating section. Therefore, it is possible to finely operate the manual operating section, and to thereby control the functions of car-mounted electrical devices. By applying external force to the manual operating section when the manual operating section is operated to the moving limit, the operator can sense the moving limit of the manual operating section, and can select a car-mounted electrical device.

31 Claims, 26 Drawing Sheets

FIG. 10

| | X0 | X1 | X2 | X3 | X4 | X5 | X6 | X7 |
|---|---|---|---|---|---|---|---|---|
| Y7 | +1<br>−1 | +1<br>0 | +1<br>0 | 0<br>0 | 0<br>0 | −1<br>0 | −1<br>0 | −1<br>−1 |
| Y6 | 0<br>−1 | +1<br>−1 | +1<br>0 | 0<br>0 | 0<br>0 | −1<br>0 | −1<br>−1 | 0<br>−1 |
| Y5 | 0<br>−1 | 0<br>−1 | +1<br>−1 | 0<br>0 | 0<br>0 | −1<br>−1 | 0<br>−1 | 0<br>−1 |
| Y4 | 0<br>0 | 0<br>0 | 0<br>0 | 0<br>0 | 0<br>0 | 0<br>0 | 0<br>0 | 0<br>0 |
| Y3 | 0<br>0 | 0<br>0 | 0<br>0 | 0<br>0 | 0<br>0 | 0<br>0 | 0<br>0 | 0<br>0 |
| Y2 | 0<br>+1 | 0<br>+1 | +1<br>+1 | 0<br>0 | 0<br>0 | −1<br>+1 | 0<br>+1 | 0<br>+1 |
| Y1 | 0<br>+1 | +1<br>+1 | +1<br>0 | 0<br>0 | 0<br>0 | −1<br>0 | −1<br>+1 | 0<br>+1 |
| Y0 | +1<br>+1 | +1<br>0 | +1<br>0 | 0<br>0 | 0<br>0 | −1<br>0 | −1<br>0 | −1<br>+1 |

Y-DIRECTION − → +

X-DIRECTION − → +

CAR-MOUNTED INPUT DEVICE

BACKGROUND OF THE INVENTION

1. Field of the Invention

The present invention relates to a car-mounted input device which allows various electrical devices mounted in a car to be collectively operated by a single manual operating section, and more particularly, to a means for improving operability of the input device.

2. Description of the Related Art

Recently, cars are equipped with various electrical devices, such as air conditioners, radios, televisions, CD players, and navigation systems. When such multiple electrical devices are individually operated by respective operating members provided therefor, problems may arise during driving of cars. In order to easily turn a desired electrical device on and off and to easily select functions thereof while safely driving the car, a car-mounted input device has been proposed hitherto, which allows various electrical devices to be operated in various manners by manipulating a single manual operating section.

Such a conventional car-mounted input device will be described below with reference to FIGS. 28 to 31. FIG. 28 is an interior view of a car, showing an example of a manner of installation of a conventional car-mounted input device, FIG. 29 is a side view of the conventional car-mounted input device, FIG. 30 is a plan view of a manual operating section in the car-mounted input device shown in FIG. 29, and FIG. 31 is a plan view of a guide plate incorporated in the car-mounted input device shown in FIG. 29.

Referring to FIG. 28, a conventional car-mounted input device 100 of this example is installed in a console box 200 between the driver's seat and the front passenger's seat in a car. As shown in FIG. 29, the car-mounted input device 100 primarily comprises a manual operating section 110 (see FIG. 30) serving as a signal input means and including two click switches 111 and 112 and three rotary variable resistors 113, 114, and 115, an X-Y table 120 to be driven in two intersecting directions (a direction orthogonal to the plane of the paper in FIG. 29 and a right and left direction in the figure) by the manual operating section 110, a stick controller 130 serving as a position signal input means for inputting signals in accordance with the direction and amount of operation of the X-Y table 120 to external devices, and a guide plate 140 (see FIG. 31) in engagement with an engaging pin 160 projecting from the lower surface of the X-Y table 120.

The manual operating section 110 and the X-Y table 120 are combined via a connecting shaft 150, and the X-Y table 120 and the guide plate 140 are engaged by movably fitting the leading end of the engaging pin 160 in a guide groove 141 formed on the guide plate 140. The guide groove 141 may have an arbitrary shape such that the leading end of the engaging pin 160 can move in specific directions. For example, as shown in FIG. 31, the guide groove 141 may be formed in the shape of a cross in plan view on the upper surface of the guide plate 140 so that the leading end of the engaging pin 160 can move from the center position A to end points B, C, D, and E along two directions that are substantially orthogonal thereto. That is, the engaging pin 160 can be moved along the guide groove 141 of the guide plate 140 via the X-Y table 120 by operating the manual operating section 110. In a state in which the leading end of the engaging pin 160 is placed at the point A, B, C, D, or E in the guide groove 141, information (a position signal) about the engaging position is output from the stick controller 130. For this reason, it is possible to alternatively select a function of the car-mounted electrical device to be operated (a function to be controlled) based on such a position signal. When a desired function of the electrical device is selected, it can be adjusted and switched by appropriately operating the three rotary variable resistors 113 to 115 provided in the manual operating section 110.

The car-mounted input device 100 with such a configuration can collectively operate a plurality of electrical devices mounted in the car, in combination with a switch device 170 for alternatively selecting a desired one of the plural electrical devices, a display device 180 for displaying the name of the electrical device selected by the switch device 170, the details of the operation by the car-mounted input device 100, and the like, and a computer (not shown) for controlling the electrical devices. The switch device 170 is installed in the console box 200. Control switches 171*a* to 171*e* of the switch device 170 are placed adjacent to the car-mounted input device 100, and are respectively connected to different electrical devices. For example, when it is assumed that the control switches 171*a* to 171*e* are respectively connected to an air conditioner, a radio, a television, a CD player, and a navigation system mounted in the car, the air conditioner is turned on and off and an air conditioner mode is designated in the car-mounted input device 100 by operating the control switch 171*a*, and the radio is turned on and off and a radio mode is designated in the car-mounted input device 100 by operating the control switch 171*b*. Similarly, by operating the other control keys 171*c* to 171*e*, the electrical devices corresponding thereto are turned on and off, and the modes thereof are designated in the car-mounted input device 100. The display device 180, such as a liquid crystal display, is placed at such a position that it is readily viewed from the driver's seat, and the computer is installed inside the console box 200.

While the functions of the electrical device selected by the switch device 170 can be selected and controlled by operating the car-mounted input device 100, the functions to be selected and controlled by operating the car-mounted input device 100 vary depending on the type of the selected electrical device. For example, when an air conditioner mode is designated by operating the switch device 170, the engaging pin 160 is placed into the end point B in the guide groove 141 of the guide plate 140 by operating the manual operating section 110, and the click switch 111 is depressed and clicked, whereby a function "air flow control" is selected. When the engaging pin 160 is placed into the end point C in the guide groove 141 and the click switch 111 is clicked, a function "control of air blow position" is selected. Similarly, when the engaging pin 160 is placed into the end points D and E in the guide groove 141 and the click switch 111 is clicked, functions "control of air blow direction" and "temperature control" are selected.

After the function is selected, it can be controlled by appropriately operating the rotary variable resistors 113 to 115. For example, when an air conditioner mode is selected by the switch device 170 and "air flow control" is selected by the manual operating section 110, the volume of air from the air conditioner can be controlled by operating the rotary variable resistor 113. When the air conditioner mode is similarly selected and "control of air blow position" is selected, the air blow position of the air conditioner can be controlled by operating the rotary variable resistors 114 and 115. When a radio mode is selected by the switch device 170 and "volume control" is selected by manual operating section 110, the volume of the radio can be controlled by operating the rotary variable resistor 113. When the radio mode is similarly selected and "tuning" is selected, the radio can be tuned by operating the rotary variable resistors 114 and 115.

In the conventional car-mounted input device 100, the direction and range of operation of the manual operating section 110 are limited by fitting the leading end of the engaging pin 160, which is combined with the manual operating section 110 via the connecting shaft 150 and the X-Y table 120, in the guide groove 141 of the guide plate 140. Therefore, an operator can know the operation limit of the manual operating section 110 from the contact of the leading end of the engaging pin 160 with the end points of the guide groove 141.

In such a configuration, however, when excessive operating force is applied to the manual operating section 110, the engaging pin 160 or the guide groove 141 may be broken. In addition, it is impossible to appropriately adjust the speed for controlling the function of the selected car-mounted electrical device in accordance with the amount of operation of the manual operating section 110. That is, in the conventional car-mounted input device 100, the functions of the selected car-mounted electrical device are not controlled by the manual operating section 110, but are controlled by the rotary variable resistors 113 to 115 provided in the manual operating section 110. Understandably, it is impossible to appropriately adjust the speed for controlling the functions of the selected car-mounted electrical device in accordance with the amount of operation of the manual operating section 110. For this reason, it is necessary to alternately use the manual operating section 110 and the rotary variable resistors 113 to 115, and this may hinder quick control of the functions of the selected car-mounted electrical device.

SUMMARY OF THE INVENTION

The present invention has been made to overcome the above problems in the conventional art, and an object of the invention is to provide a car-mounted input device with superior operability which makes it easy to select a desired car-mounted electrical device and to control the functions thereof by using a manual operating section.

In order to overcome the above problems, according to an aspect of the present invention, there is provided a car-mounted input device including: a manual operating section; a control shaft connected to the manual operating section; a position sensor for outputting a position signal in accordance with the direction and amount of operation of the manual operating section; and an actuator for applying external force in the operating direction to the control shaft, wherein, when the manual operating section is operated within a predetermined allowable range of movement, external force preset in accordance with the amount of operation of the manual operating section is given from the actuator to the control shaft.

In this configuration, the operator feels the external force applied from the actuator and can thereby sense the amount of the operation of the manual operating section. Therefore, the operator can finely operate the manual operating section. Accordingly, it is possible not only to select a desired car-mounted electrical device by simply moving the manual operating section from the initial position to the moving limit, but also to control the function of the selected car-mounted electrical device while adjusting the amount of operation of the manual operating section. This can improve operability of the manual operating section and operability of the car-mounted input device. Furthermore, since external force of a predetermined amount is applied from the actuator to the control shaft, the control shaft, a bearing, or the like will not break.

According to a second aspect of the present invention, there is provided a car-mounted input device including: a manual operating section; a control shaft connected to the manual operating section; a position sensor for outputting a position signal in accordance with the direction and amount of operation of the manual operating section; and an actuator for applying external force to the control shaft, wherein, when the manual operating section is operated in a direction outside a predetermined allowable range of movement, external force preset in accordance with the direction and amount of operation of the manual operating section is applied from the actuator to the control shaft.

In this configuration, when the manual operating section is operated in a direction outside the predetermined allowable range of movement, external force is applied from the actuator to the control shaft. By feeling the external force, the operator can sense whether the operating direction is correct, and can operate the manual operating section only within the allowable range of movement. This improves operability of the manual operating section.

Preferably, the control shaft is pivotally held by a bearing. In this case, the structure for holding the control shaft is simplified, and therefore, the cost is reduced.

Preferably, the control shaft is fixed to a slider so as to slide on a rail. In this case, since the control shaft can be operated along the rail in a fixed plane, operability of the control shaft is improved.

Preferably, the manual operating section can be reciprocally operated only in a specific direction. In this case, it is possible to select a desired car-mounted electrical device and to adjust the function of the car-mounted electrical device by reciprocally operating the manual operating section only in the specific direction, and operability of the manual operating section is improved.

Preferably, the manual operating section can be operated in an arbitrary direction in a specific plane. In this case, it is possible to increase the number of car-mounted electrical devices to be selected and controlled, and to increase the number of functions to be controlled.

The actuator may include a voice coil motor. Since the voice coil motor is used as the actuator for applying external force to the manual operating section, a mechanism for converting the rotation of the motor into reciprocal linear movement is unnecessary, and the size and cost of the car-mounted input device can be reduced.

Preferably, with an increase in amount of operation of the manual operating section, external force to be applied from the actuator to the control shaft is sequentially increased, or the mode of vibration to be applied is changed. This makes it possible to sense the amount of operation of the manual operating section, and to further improve operability of the car-mounted input device.

Preferably, when the manual operating section is operated to a predetermined operation limit, a shocking (i.e. mechanical) external force is applied from the actuator to the control shaft. Since this makes it possible to tactilely detect that the amount of operation of the manual operating section has reached the limit, operability of the car-mounted input device can be further improved.

Preferably, the position sensor is electrically connected to a display device provided in a car via a computer in the car, and the display device displays the type of car-mounted electrical device selected by operating the manual operating section, the function of the car-mounted electrical device to be controlled by operating the manual operating section, and the details of the operation of the manual operating section. In this case, the car occupant can adjust the function of the car-mounted electrical device while checking the contents displayed on the display device and can quickly and reliably adjust the function of the electrical device.

Preferably, a seat adjusting device serving as a car-mounted electrical device for controlling the position of the driver's seat or the passenger's seat is operated by the manual operating section. In this case, a required operation can be performed by using the manual operating section within easy reach, and therefore, the position of the driver's seat or the passenger's seat may be easily adjusted.

Preferably, a tilting device and a telescoping device provided in a steering device serving as a car-mounted electrical device for adjusting the height of the steering wheel are operated by the manual operating section. In this case, since a required operation can be performed by using the manual operating section within easy reach, the height of the steering wheel may be easily adjusted.

Further objects, features, and advantages of the present invention will become apparent from the following description of the preferred embodiments with reference to the attached drawings.

BRIEF DESCRIPTION OF THE DRAWINGS

FIG. 10 is a chart showing an example of a data table to be stored in a memory of a computer.

DESCRIPTION OF THE PREFERRED EMBODIMENTS

A car-mounted input device according to a first embodiment of the present invention will be described below with reference to the attached drawings.

Figure 1:
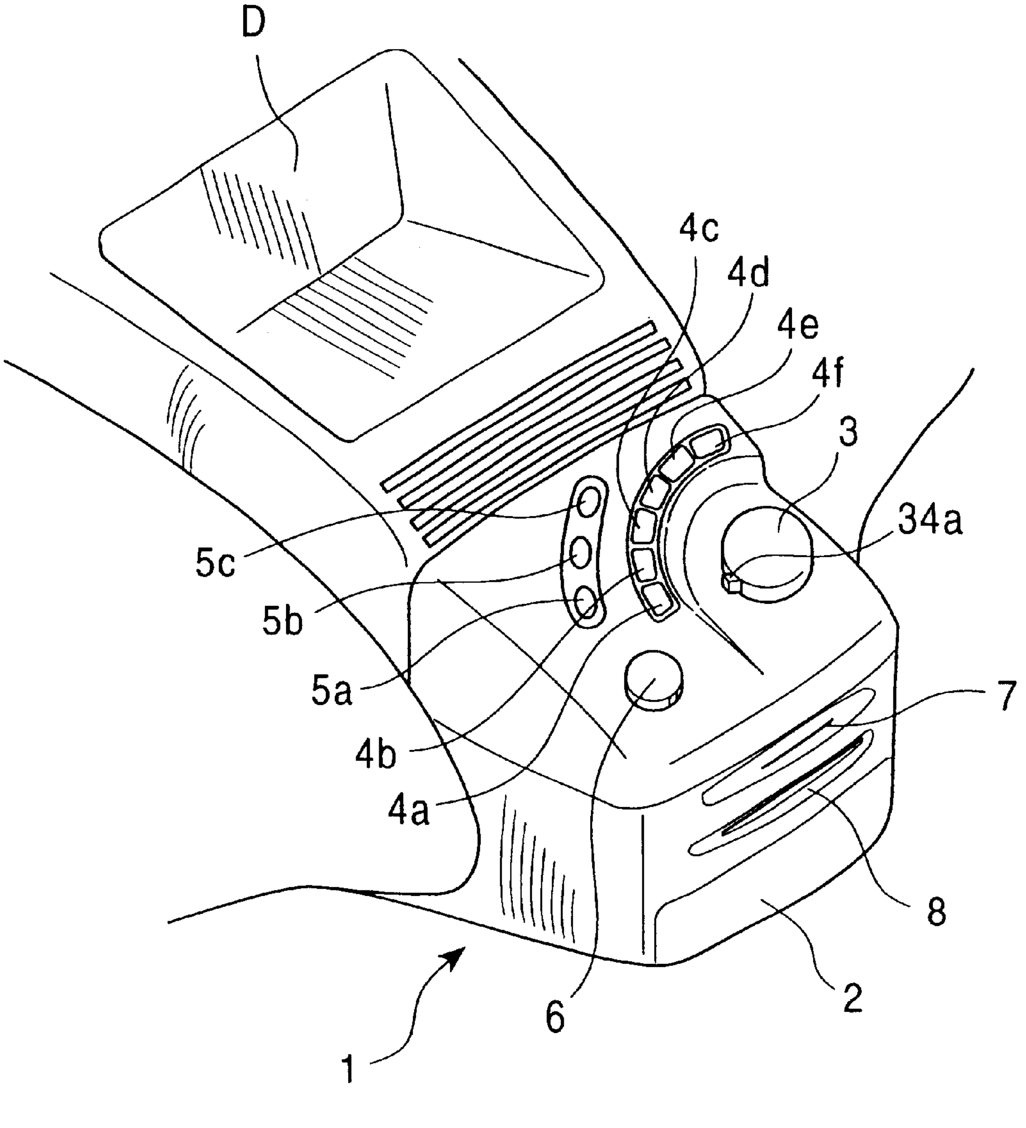
FIG. 1 is a perspective view showing a state in which a car-mounted input device according to a first embodiment of the present invention is installed in a dashboard.
Figure 2:
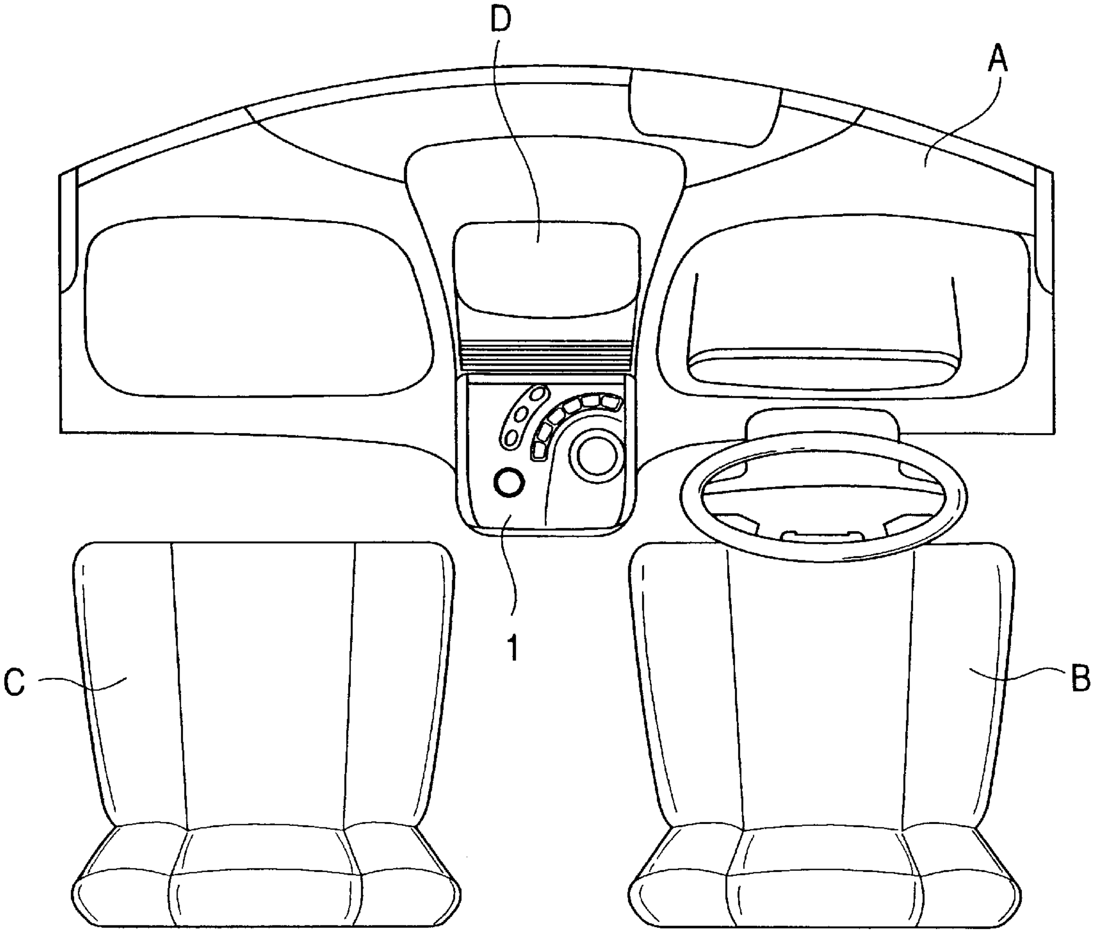
FIG. 2 is a plan view showing a state in a cabin of a car in which the car-mounted input device of the first embodiment is installed.

FIG. 1 is a perspective view showing a state in which a car-mounted input device of the first embodiment is mounted in a dashboard, and FIG. 2 shows the interior state of a car equipped with the car-mounted input device of the first embodiment. As shown in FIG. 1, a car-mounted input device 1 of this embodiment has a housing 2 shaped like a rectangular container of a required size. Arranged on the upper surface of the housing 2 are a manual operating section 3, six pushbutton switches 4*a*, 4*b*, 4*c*, 4*d*, 4*e*, and 4*f* arranged in the form of an arc centered on the mounting position of the manual operating section 3, three pushbutton switches 5*a*, 5*b*, and 5*c* arranged concentrically with the six pushbuttons on the periphery thereof, and a volume control knob 6. A card slot 7 and a disk slot 8 are formed in the front face of the housing 2. The car-mounted input device 1 is installed in a dashboard A between the driver's seat B and the front passenger's seat C in the car, and serves required functions in cooperation with a display device D and a computer (not shown) placed inside the dashboard A.

The above-described nine pushbuttons 4*a*, 4*b*, 4*c*, 4*d*, 4*e*, 4*f*, 5*a*, 5*b*, and 5*c* are respectively connected to car-mounted electrical devices, such as an air conditioner, a radio, a television, a CD player, and a car navigation system, to be operated through the car-mounted input device 1. While combinations of the pushbutton switches and the car-mounted electrical devices may be arbitrarily determined, in the car-mounted input device 1 of this embodiment, the pushbutton switch 4*a* is connected to a menu selection device, the pushbutton switch 4*b* is connected to a telephone, the pushbutton switch 4*c* is connected to an air conditioner, the pushbutton switch 4*d* is connected to a car navigation system, the pushbutton switch 4*e* is connected to a radio, the pushbutton switch 4*f* is connected to a card reader/writer or a disk drive, the pushbutton switch 5*a* is connected to a device for controlling the position of the car-mounted input device 1, the pushbutton switch 5*b* is connected to an on-off control device for a liquid crystal shutter disposed over the entire surface of the display device D, and the pushbutton switch 5*c* is connected to a television. By depressing a knob of a desired pushbutton switch, a car-mounted electrical device connected thereto is selected. The surface of each pushbutton switch has a letter, a symbol, or the like representing a corresponding car-mounted electrical device (not shown).

Figure 3:
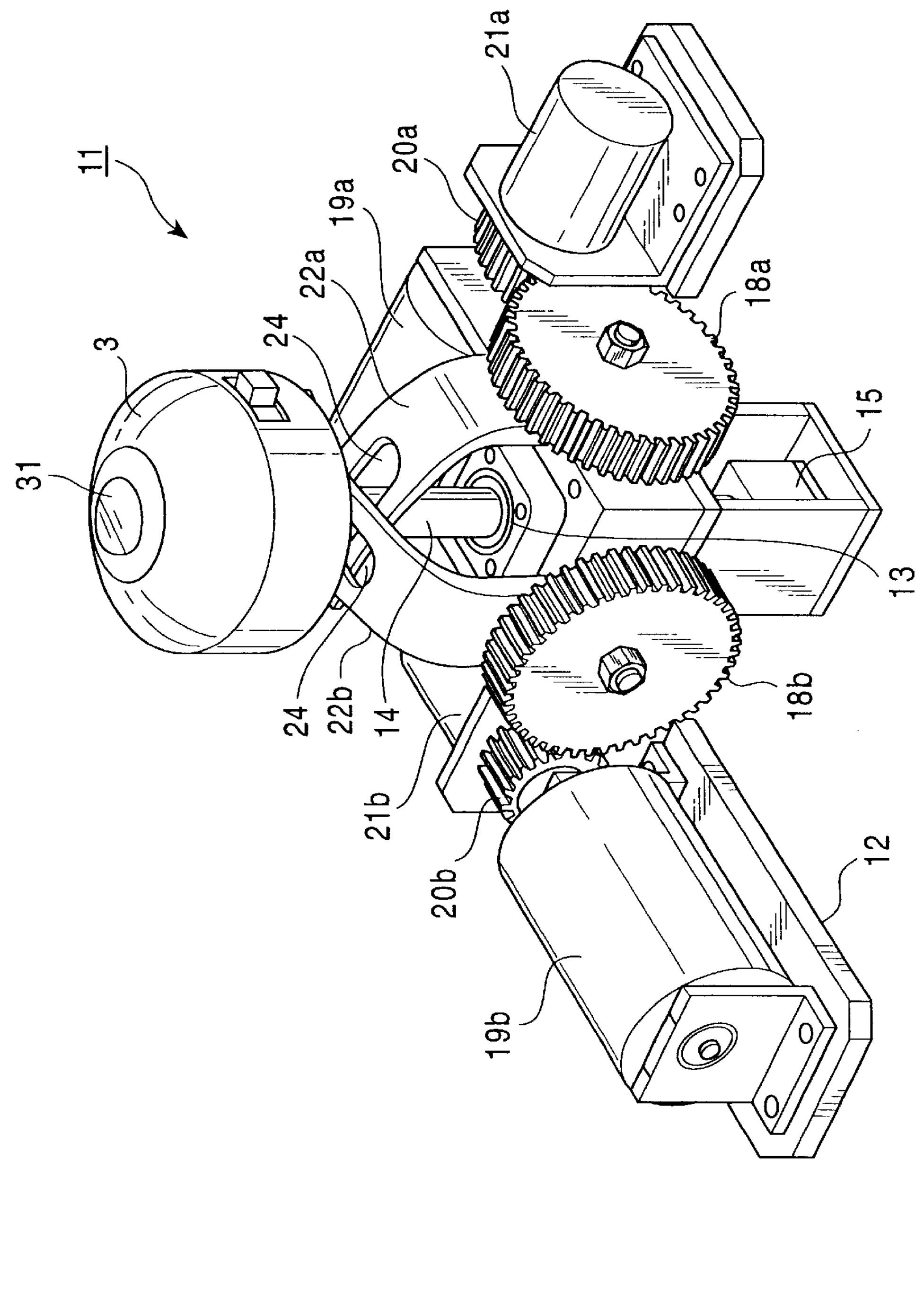
FIG. 3 is a perspective view of a manual operating section, and a mechanism section including the manual operating section in the first embodiment.
Figure 4:
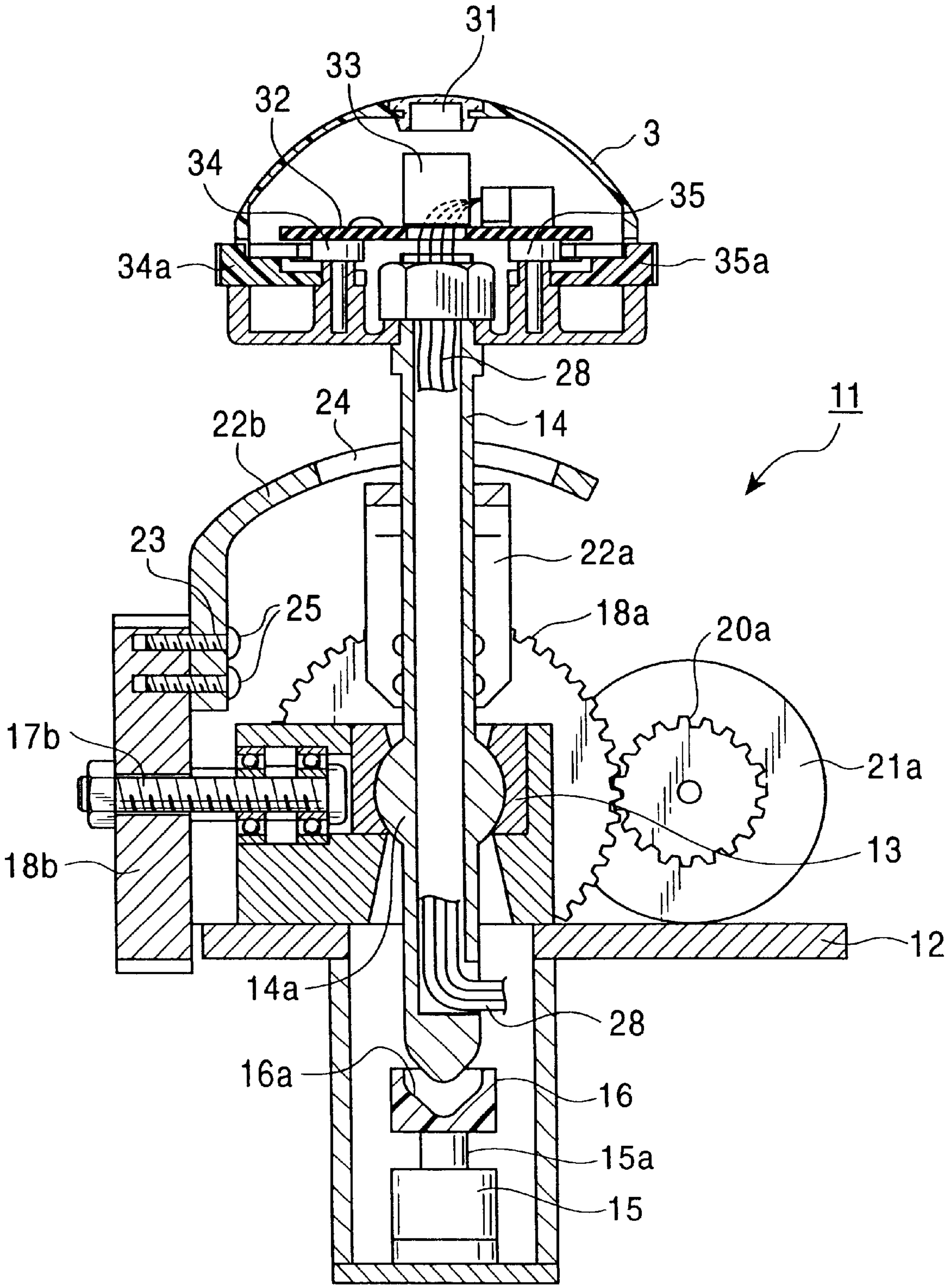
FIG. 4 is a sectional side view showing the principal parts of the manual operating section and the mechanism section.
Figure 5:
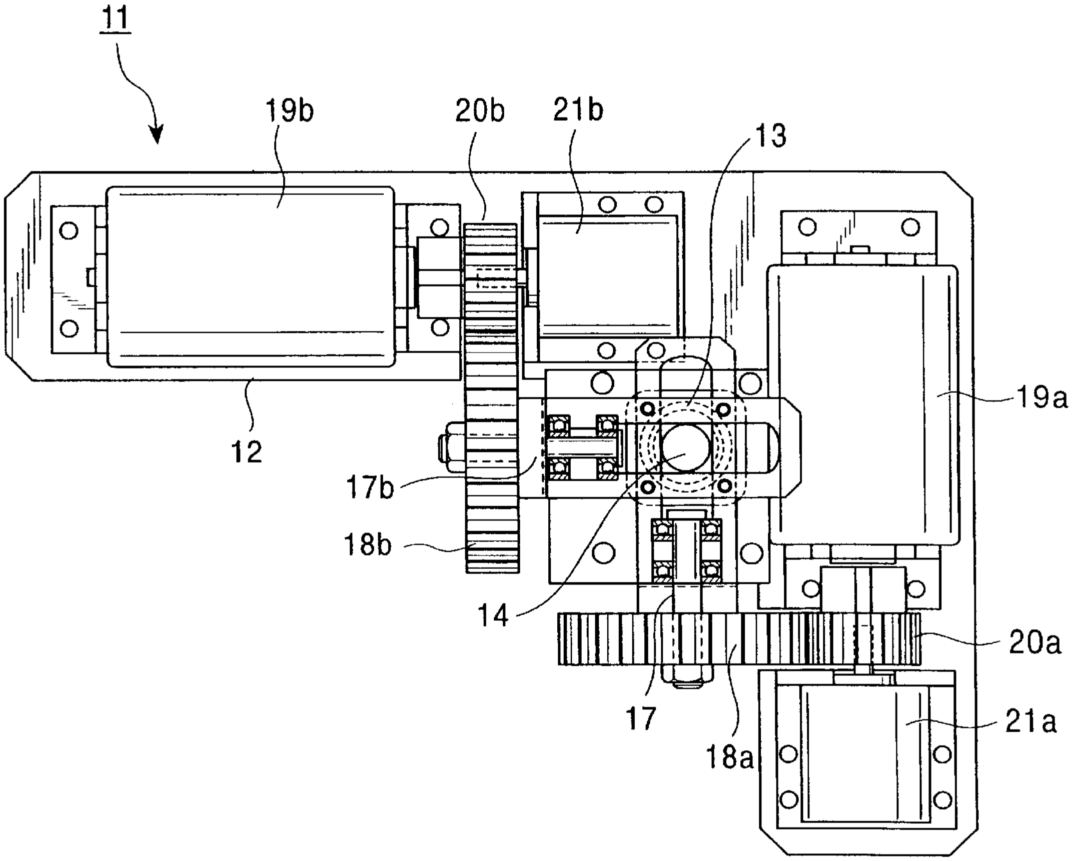
FIG. 5 is a plan view of the mechanism section.
Figure 6:
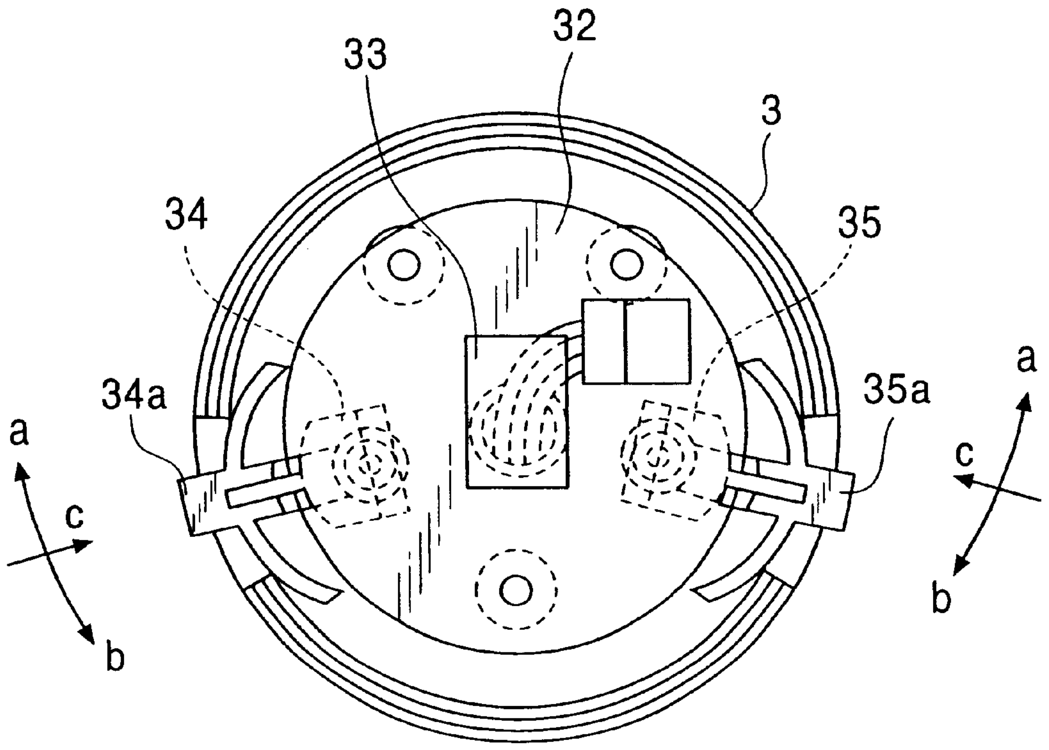
FIG. 6 is a plan view of the manual operating section from which a cover is removed.

FIG. 3 is a perspective view of the manual operating section 3, and a mechanism section 11 including the manual operating section 3, FIG. 4 is a sectional side view showing the principal parts of the manual operating section 3 and the mechanism section 11, FIG. 5 is a sectional plan view showing the principal part of the mechanism section 11, and FIG. 6 is a plan view of the manual operating section 3 from which a cover is removed.

As shown in FIGS. 3 to 5, the mechanism section 11 comprises a base 12 attached to the bottom face of the housing 2, a spherical bearing 13 mounted on the base 12, a control shaft 14 with a spherical portion 14*a* formed slightly offset downward from the center so as to be rotatably supported by the spherical bearing 13, a solenoid 15 disposed below the spherical bearing 13, a clamping member 16 for the control shaft 14 mounted at the upper end of a driving shaft 15*a* of the solenoid 15, two rotation shafts 17*a* and 17*b* disposed on the axes intersecting in a plane in parallel with the base 12, centered on the spherical bearing 13, two wheels 18*a* and 18*b* fixed to the leading ends of the rotation shafts 17*a* and 17*b*, two electric motors 19*a* and 19*b* placed in parallel with the rotation shafts 17*a* and 17*b*, two pinions 20*a* and 20*b* fixed to the main shafts of the electric motors 19*a* and 19*b* so as to be meshed with the wheels 18*a* and 18*b*, two encoders 21*a* and 21*b* for detecting the direction and amount of rotation of the main shafts of the electric motors 19*a* and 19*b*, and L-shaped members 22*a* and 22*b* for converting the pivotal movement of the control shaft 14 in the X-direction and the Y-direction (see FIG. 5) into the rotation in the X-direction and the Y-direction, and transmitting the rotation to the rotation shafts 17*a* and 17*b*. The manual operating section 3 is mounted at the upper end of the control shaft 14.

The bottom portion of the control shaft 14 is shaped like a cone so as to be tapered down toward the bottom, and the upper surface of the clamping member 16 opposing thereto is provided with a substantially conical recess 16*a* that allows the leading end of the control shaft 14 to be inserted therein. Therefore, when the clamping member 16 is raised by activating the solenoid 15, the control shaft 14 is clamped with its leading end inserted in the recess 16*a*, thereby prohibiting the control shaft 14 from pivoting on the spherical portion 14*a*. In contrast, when the clamping member 16 is moved down by deactivating the solenoid 15, the control shaft 14 is disengaged from the clamping member 16, and is allowed to pivot on the spherical portion 14*a*. The operations of activating and deactivating the solenoid 15 will be described later.

As the wheels 18*a* and 18*b* and the pinions 20*a* and 20*b*, normal types of gears within the specifications may be used. More preferably, gears devised to eliminate backlash are used. In order to eliminate backlash, for example, elastic members, such as rubber, are placed at the tops of teeth of the wheels 18*a* and 18*b* and/or the pinions 20*a* and 20*b*, and the wheels 18*a* and 18*b* and the pinions 20*a* and 20*b* are meshed with each other via the elastic members.

Each of the L-shaped members 22*a* and 22*b* has screw holes 23 on one side, and a control shaft penetrating slot 24 on the other side. As shown in FIG. 4, the L-shaped members 22*a* and 22*b* are fastened, on one side, to the side faces of the wheels 18*a* and 18*b* by screws 25 passed through the screw holes 23 while the control shaft 14 is passed through the control shaft penetrating slot 24. In order to reduce backlash produced between the control shaft penetrating slot 24 and the control shaft 14, the width of the control shaft penetrating slot 24 is set so as to be as close to the diameter of the control shaft 14 as possible and so as to allow the control shaft 14 to smoothly slide therealong. The length of the control shaft penetrating slot 24 is set to be equal to or more than the moving range of the control shaft 14. Therefore, when the control shaft 14 is pivoted from the center position while gripping the manual operating section 3, the L-shaped members 22*a* and 22*b* are turned by the amount in accordance with the X-direction and Y-direction components of the pivotal movement, and the turn is transmitted to the encoders 21*a* and 21*b* via the wheels 18*a* and 18*b* and the pinions 20*a* and 20*b*, whereby the direction and amount of pivotal movement of the control shaft 14 are detected by the computer placed inside the dashboard A.

The manual operating section 3 is shaped like a dome having a transparent window 31 at the top center, as shown in FIGS. 3 and 4, and has therein a circuit board 32, a photo-interrupter 33 formed of a combination of a light-emitting device and a photoreceptor mounted on a portion of the circuit board 32 opposing the transparent window 31, and first and second switches 34 and 35 mounted on the periphery of the circuit board 32, as shown in FIGS. 4 and 6.

The photo-interrupter 33 serves to control the on and off states of the solenoid 15. When light with a predetermined wavelength, such as infrared light, is emitted from the light-emitting device (not shown) and enters the photoreceptor (not shown), the photo-interrupter 33 activates the solenoid 15, moves the clamping member 16 down to disengage from the control shaft 14, and allows the control shaft 14 to pivot. Supply of power to the photo-interrupter 33 and transmission of signals from the photo-interrupter 33 are performed by cords 28 passed through the control shaft 14.

On the other hand, the first and second switches 34 and 35 function as a rotation detection switch and a press detection switch. When the first and second switches 34 and 35 are in a non-operation state, knobs 34*a* and 35*a* thereof are placed in the center position. This type of switch has been proposed in a publication to the same assignee. The first and second knobs 34*a* and 35*a* for operating the first and second switches 34 and 35 are symmetrically placed on the outer peripheral surface of the manual operating section 3, as shown in FIG. 6, so as to be turned from the center position in the directions of the arrows "a" and "b" along the outer peripheral surface of the manual operating section 3 and so as to be depressed in the direction of the arrow "c".

The first and second switches 34 and 35 are set so that the operating directions of the first and second knobs 34*a* and 35*a* and the functions switched thereby are the same. That is, while the first and second switches 34 and 35 serve to switch the functions of a car-mounted electrical device selected by operating any of the pushbutton switches 4*a*, 4*b*, 4*c*, 4*d*, 4*e*, and 4*f* provided on the upper surface of the housing 2, they can switch the same function of the selected car-mounted electrical device by being operated in the same direction. For example, when the air conditioner is selected by operating the pushbutton switch 4*c*, the setting temperature thereof is raised by operating the first or second knob 34*a* or 35*a* of the first or second switch 34 or 35 in the direction of the arrow "a", and is lowered by operating the knob 34*a* or 35*a* in the direction of the arrow "b". The air conditioner is turned on and off by operating the first or second knob 34*a* and 35*a* in the direction of the arrow "c".

When the operating directions of the first and second knobs 34*a* and 35*a* and the functions switched thereby are the same in this way, in both the cases in which the car-mounted input device of this embodiment is installed in a car with a right-hand steering wheel and in a car with a left-hand steering wheel, the same function can be switched by operating the knob, which is positioned in the same relationship with the driver, in the same direction. Therefore, the driver is less prone to make driving errors, and the car-mounted input device with the same structure is applied to a car with a right-hand steering wheel and a car with a left-hand steering wheel, thereby improving versatility of the car-mounted input device. In addition, since the switches in the manual operating section 3 can be similarly manipulated in the driver's seat and in the front passenger's seat by using the first knob 34*a* and the second knob 35*a*, the passenger can operate the car-mounted input easily, thus reducing driving errors, and improving operability of the car-mounted input device.

The electric motors 19*a* and 19*b* serve to give resistance to the operation of the manual operating section 3, and are used, for example, to regulate the operating direction of the manual operating section 3, the operating speed in accordance with the amount of operation of the manual operating section 3, and the stop point of the manual operating section 3.

That is, since the manual operating section 3 pivots in a predetermined direction so as to select a car-mounted electrical device to be controlled and to adjust the function of the selected car-mounted electrical device, if it is not precisely operated in the predetermined direction, it cannot precisely select the car-mounted electrical device and adjust the function. Accordingly, the manual operating section 3 can be operated in the predetermined direction by a small operating force, whereas it is operated in the other directions with resistance caused by driving the electric motors 19*a* and 19*b* so as to impose torque on the control shaft 14 in the direction opposite from the operating direction of the manual operating section 3. Since this allows the operator to sense that the manual operating section 3 has been operated in an undesirable direction, it is possible to prevent errors in selecting a car-mounted electrical device and in controlling the function thereof.

In order to control the function of the car-mounted electrical device by operating the manual operating section 3, for example, in order to change the setting temperature of the air conditioner, the setting temperature is slowly switched when the amount of operation of the manual operating section 3 is small, whereas it is quickly switched when the amount of operation is increased. For this reason, if no resistance is given to the operation of the manual operating section 3, the amount of operation of the manual operating section 3 tends to increase, and it is difficult to precisely and promptly make a small change in setting temperature, which deteriorates operability. Accordingly, when the amount of operation of the manual operating section 3 increases to a certain degree, a torque in the direction opposite from the operating direction is imposed on the control shaft 14 by driving the electric motors 19*a* and 19*b* so as to give resistance to the operation of the manual operating section 3. This allows the operator to sense that the setting temperature of the air conditioner cannot be finely controlled because the amount of operation of the manual operating section 3 is too large, and to precisely and promptly make fine adjustments to the setting temperature of the air conditioner. Instead of giving resistance to the operation of the manual operating section 3 when the amount of operation thereof increases to a certain degree, different resistances may be sequentially given to the manual operating section 3 in accordance with the amount of operation of the manual operating section 3. While, for example, the adjustment speed of the setting temperature of the air conditioner is increased as the amount of operation of the manual operating section 3 increases in the above description, resistance may also be given to the manual operating section 3 in a similar manner in a case in which the adjustment speed increases as the operating speed of the manual operating section 3 increases.

When the operation limit of the manual operating section 3 is regulated by a mechanical means, for example, by abutting the control shaft 14 against the edge of the spherical bearing 13, a great mechanical force acts on the abutting portions of the spherical bearing 13 and the control shaft 14 every time the manual operating section 3 is operated, which causes wear. Therefore, powder and related materials caused by wear enter between the spherical bearing 13 and the spherical portion 14*a* of the control shaft 14, and this may increase the operating force of the control shaft 14, or at worst, may inhibit the control shaft 14 from pivoting. Accordingly, when the manual operating section 3 is operated to a predetermined position, the electric motors 19*a* and 19*b* are driven to give, for example, a shocking torque to the control shaft 14 in the direction opposite from the operating direction. Note that a shocking force is a mechanical force that is applied from an actuator to the control shaft 14. Since this allows the operator to sense that the manual operating section 3 has been operated to the operation limit, and to stop further operation of the manual operating section 3. Moreover, the edge of the spherical bearing 13 is prevented from abutting against the control shaft 14, and the powder/other materials are reduced, thereby avoiding the above problems resulting from the powder. Furthermore, the manual operating section 3 can be automatically returned to the center position by the torque caused by the electric motors 19*a* and 19*b*, thereby improving operability of the manual operating section 3.

In addition, it is possible not only to give resistance to the manual operating section 3, but also to apply external force in the direction of movement of the manual operating section 3. For example, when controlling the volume of a radio or a CD player, which will be described later, external force may be applied to the manual operating section 3 so that the operator feels resistance when moving the manual operating section 3 in a direction to turn up the volume, and conversely, so that the operator feels acceleration when moving the manual operating section 3 in a direction to turn down the volume. This makes it possible to prevent the sound level in the cabin from being rapidly turned up when the volume is turned up. Moreover, since the volume can be promptly turned down, listening to the audio system and conversation will not be hindered.

Figure 7A:
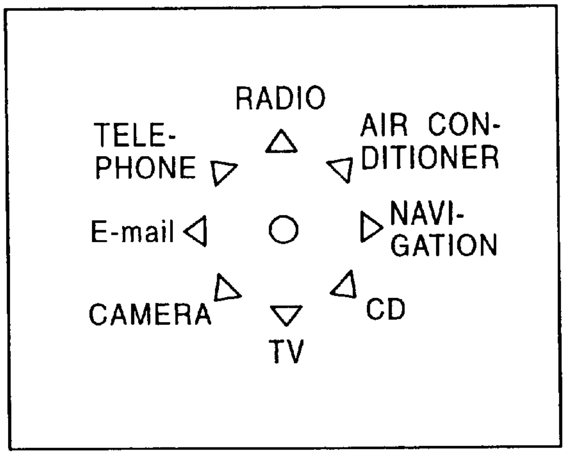
FIG. 7A is an explanatory view illustrating operating directions of the manual operating section and car-mounted electrical devices to be selected thereby.
Figure 7B:
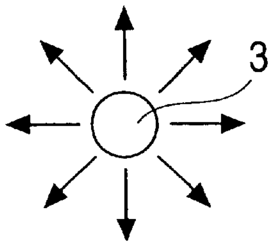
FIG. 7B is an explanatory view showing the operating directions of the manual operating section.
Figure 11:
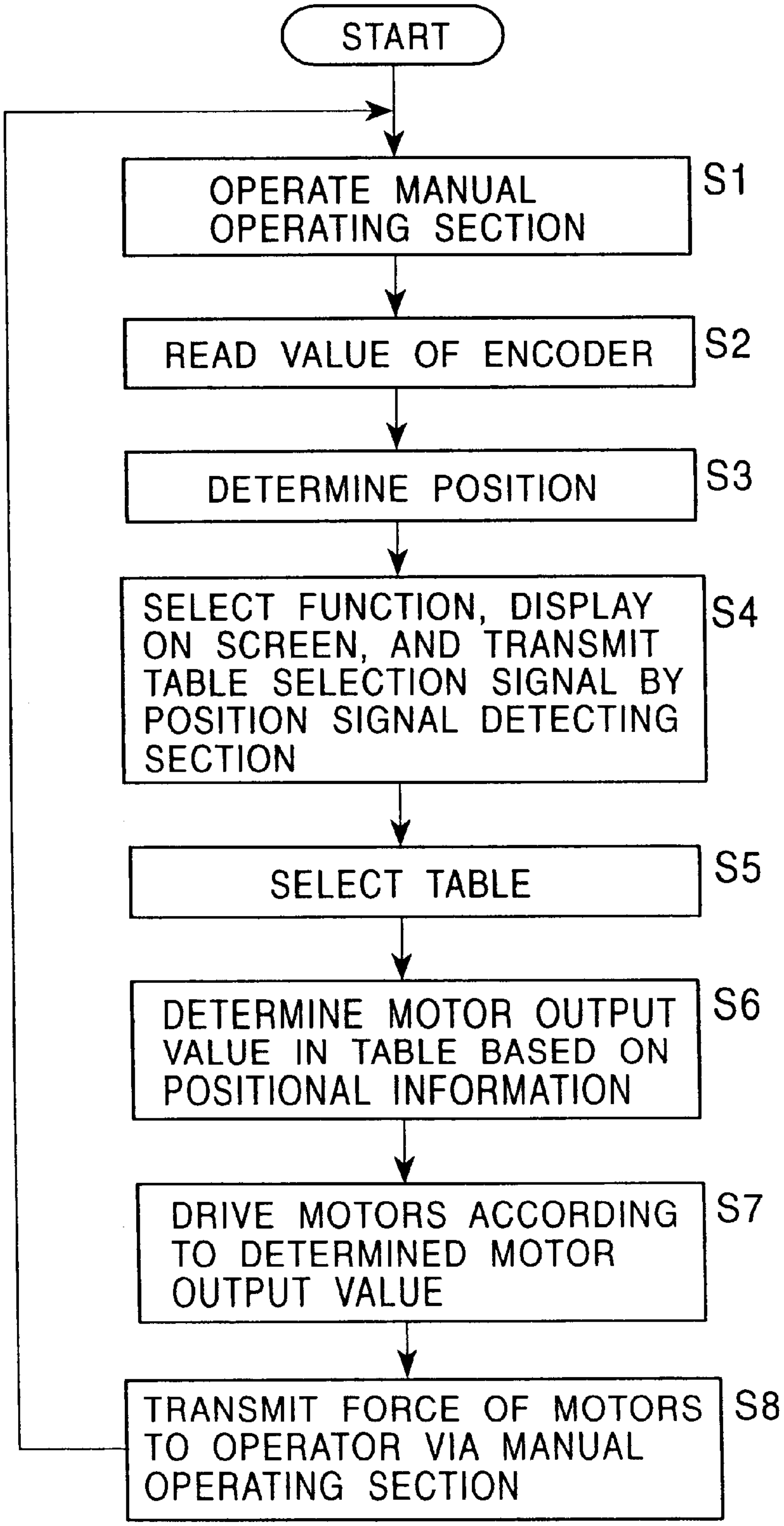
FIG. 11 is a flowchart showing the procedure for controlling the electric motors.

The electric motors 19*a* and 19*b* are controlled according to commands from the computer provided inside the dashboard A. A method for controlling the electric motors 19*a* an 19*b* by the computer will be described below with reference to FIGS. 7 to 11. FIGS. 7A and 7B are explanatory views illustrating the operating directions of the manual operating section 3 and car-mounted electrical devices to be selected thereby, FIGS. 8A and 8B are explanatory views illustrating the operating directions of the manual operating section 3 and functions to be switched thereby, FIG. 9 is a block diagram of a control system for the electric motors 19*a* and 19*b*, FIG. 10 is a chart showing an example of a data table stored in a memory of the computer, and FIG. 11 is a flowchart showing the procedure for controlling the electric motors 19*a* and 19*b*.

In the car-mounted input device 1 of this embodiment, as shown in FIGS. 7A and 7B, a radio, an air conditioner, a car navigation system, a CD player, a television, a monitor camera, an electronic mail device, and a telephone can be selected by operating the manual operating section 3 from the center position in the directions, frontward, to the front right, rightward, to the rear right, rearward, to the rear left, leftward, and to the front left. A combination of the electrical devices to be selected by the pushbutton switches 4*a*, 4*b*, 4*c*, 4*d*, 4*e*, 4*f*, 5*a*, 5*b*, and 5*c* of the car-mounted input device 1 and a combination of the electrical devices to be selected by operating the manual operating section 3 may be the same, or may be different. In this embodiment, the combinations are different.

Figure 8A:
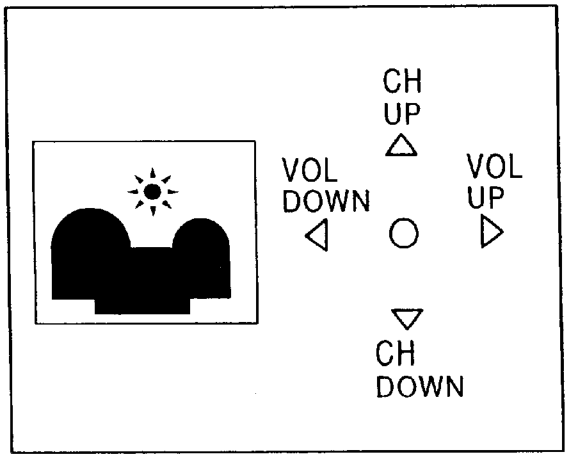
FIG. 8A is an explanatory view illustrating functions of a car-mounted electrical device.
Figure 8B:
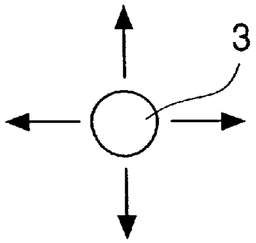
FIG. 8B is an explanatory view showing the operating directions of the manual operating section.
Figure 9:
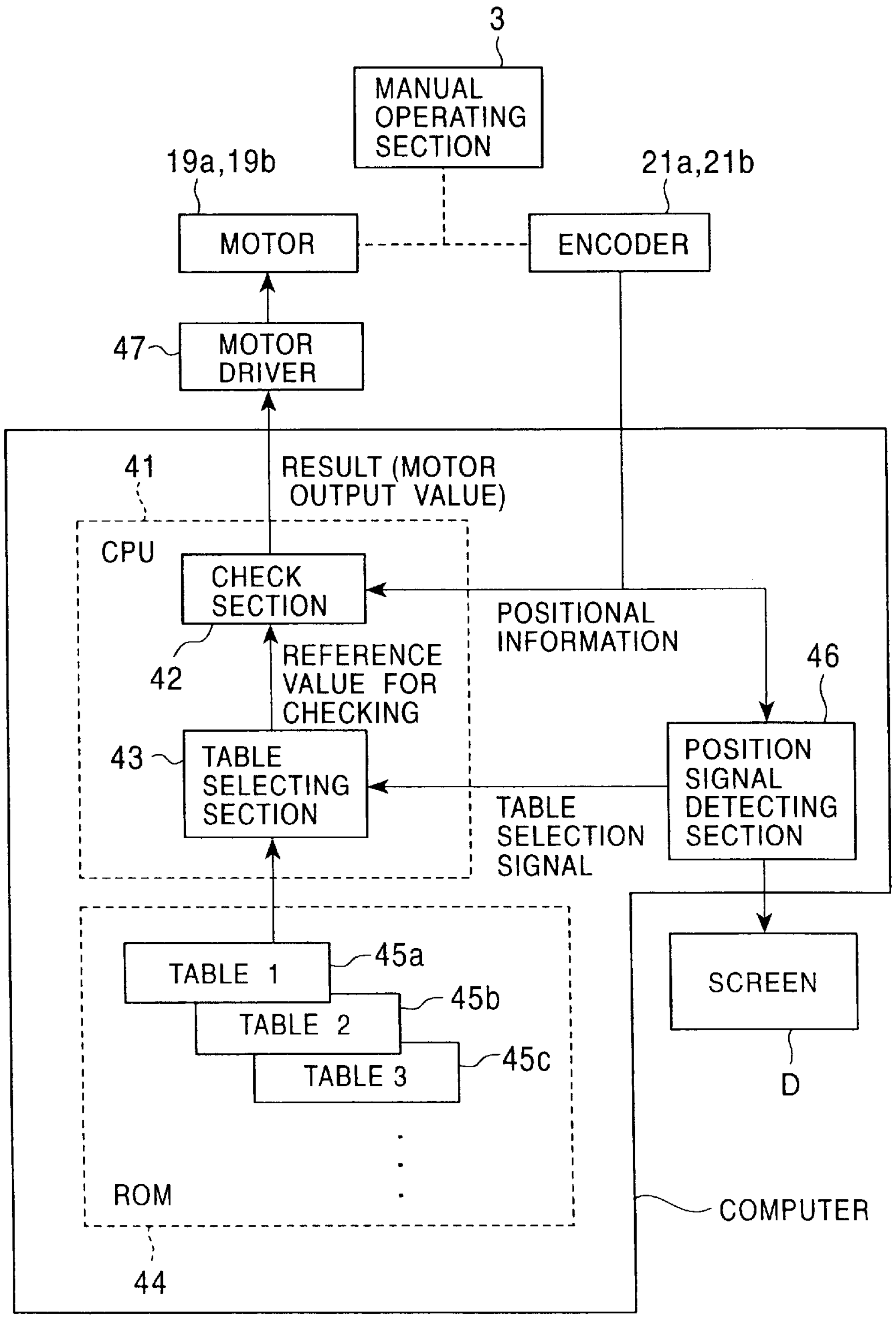
FIG. 9 is a block diagram showing a control system for electric motors in the first embodiment.

When the television is selected by operating the manual operating section 3 rearward from the center position, as shown in FIG. 8A, it is possible to turn up the channel by operating the manual operating section 3 from the center position frontward, to turn down the channel by operating the manual operating section 3 rearward, to turn up the volume by operating the manual operating section 3 rightward, and to turn down the volume by operating the manual operating section 3 leftward.

In a case in which the number of functions to be adjusted by operating the manual operating section 3 is equal to or less than eight, which is the maximum number of directions in which the manual operating section 3 can be moved, even when the manual operating section 3 is operated in a direction other than the directions assigned for function control (the directions shown in FIG. 8A), the function of the selected electrical device cannot be controlled. When such a dead zone lies in the operating range of the manual operating section 3, the operator must carefully operate the manual operating section 3 in the direction to allow function control. This impairs ease of operation, and is not preferable from the viewpoint of safe operation of the car.

Accordingly, the car-mounted input device 1 of this embodiment adopts a control system for the electric motors 19*a* and 19*b* having a configuration shown in FIGS. 9 and 10, and overcomes the above problems by controlling the electric motors 19*a* and 19*b* through the procedure shown in FIG. 11.

In the computer provided inside the dashboard A, as shown in FIG. 9, a CPU 41 includes a check section 42 and a table selecting section 43, and a ROM 44 stores tables 45*a*, 45*b*, 45*c*, etc., including the operating ranges of the manual operating section 3, the directions of rotation of the electric motors 19*a* and 19*b* and the amount of torque produced by the rotation in accordance the operating ranges in the form of codes. The computer also includes a position signal detecting section 46 which fetches signals from the encoders 21*a* and 21*b*, outputs a table selection signal corresponding to the operating range of the manual operating section 3 to the table selecting section 43, and displays the operating locus of the manual operating section 3 on the display device D.

FIG. 10 is a chart showing an example of a table stored in the ROM 44, in which the allowable range of movement of the manual operating section 3 is divided into eight equal parts in the X-direction and into eight equal parts in the Y-direction, and in which the driving, stop, and rotating directions of the electric motors 19*a* and 19*b* during operation of the manual operating section 3 are encoded and shown in the equally divided sections. The signs and numerals shown in the upper part of each section represent the driving, stop, and the rotating directions of the first electric motor 19*a*; those in the lower part represent the driving, stop, and the rotating directions of the second electric motor 19*b*. The sign "+" represents the forward rotation of the motor, and the sign "−" represents the reverse rotation of the motor. Numeral "0" indicates that the electric motor 19*a* or 19*b* is not rotated, and numeral "1" indicates that the electric motor 19*a* or 19*b* is rotated. According to this table, when the manual operating section 3 is operated in the ranges (X3, Y0) to (X3, Y7), the ranges (X4, Y0) to (X4, Y7), the ranges (X0, Y3) to (X7, Y3), and the ranges (X0, Y4) to (X7, Y4), neither of the electric motors 19*a* and 19*b* is rotated, and no resistance associated with the rotation of the electric motors 19*a* and 19*b* is given to the movement of the manual operating section 3. When the manual operating section 3 is operated in the other ranges, at least one of the electric motors 19*a* and 19*b* rotates, and the resistance associated with the rotation of the electric motor 19*a* and 19*b* is given to the movement of the manual operating section 3.

Thus, in a case in which the television is initially selected by operating the manual operating section 3, and the functions of the television can be adjusted only by operating the manual operating section 3 from the center position frontward, rearward, rightward, and leftward, when the manual operating section 3 is operated from the center position in an oblique direction other than the frontward, rearward, rightward, and leftward directions while the rotations of the electric motors 19*a* and 19*b* are controlled according to the table shown in FIG. 10, at least one of the electric motors 19*a* and 19*b* is rotated, and resistance associated with the rotation of the electric motor 19*a* or 19*b* is given to the movement of the manual operating section 3. This allows the operator to sense that the manual operating section 3 has been operated in a dead zone, and to operate the manual operating section 3 in a direction to control a desired function. Ease of operation of the manual operating section 3 is improved, and the driving of the car will not be hindered.

The computer controls the rotation of the electric motors 19*a* and 19*b* according to the procedure shown in the flowchart of FIG. 11.

When the operator operates the manual operating section 3 from the center position in any direction (Step S1), the encoders 21*a* and 21*b* are rotated via the L-shaped members 22*a* and 22*b*, the wheels 18*a* and 18*b*, and the pinions 20*a* and 20*b* by the amount proportional to the amount of pivotal movement of the manual operating section 3 in the pivoting direction, thereby outputting position signals. The position signal detecting section 46 in the computer reads these position signals (Step S2), determines the operating position of the manual operating section 3 (Step S3), transmits a table selection signal to the table selecting section 43, and transmits the position signals to the display device D (Step S4). The table selecting section 43 in the CPU 41 selects and fetches a predetermined table from the ROM 44 based on the table selection signal from the position signal detecting section 46 (Step S5). The check section 42 in the CPU 41 determines a motor output value based on the position signals output from the encoders 21*a* and 21*b* and the table fetched by the table selecting section 43, and outputs the motor output value to a motor driver 47 (Step S6). The motor driver 47 drives the electric motors 19*a* and 19*b* according to the motor output value, thereby giving resistance to the movement of the manual operating section 3 (Step S7). The operator senses the resistance at the manual operating section 3, and changes the operating position of the manual operating section 3 (Step S8).

The motor control means and method are applied not only to regulation of the operating direction of the manual operating section 3, but also to the above-described application of resistance in accordance with the amount of operation of the manual operating section 3 and resistance at the operation limit of the manual operating section 3.

Figure 12:
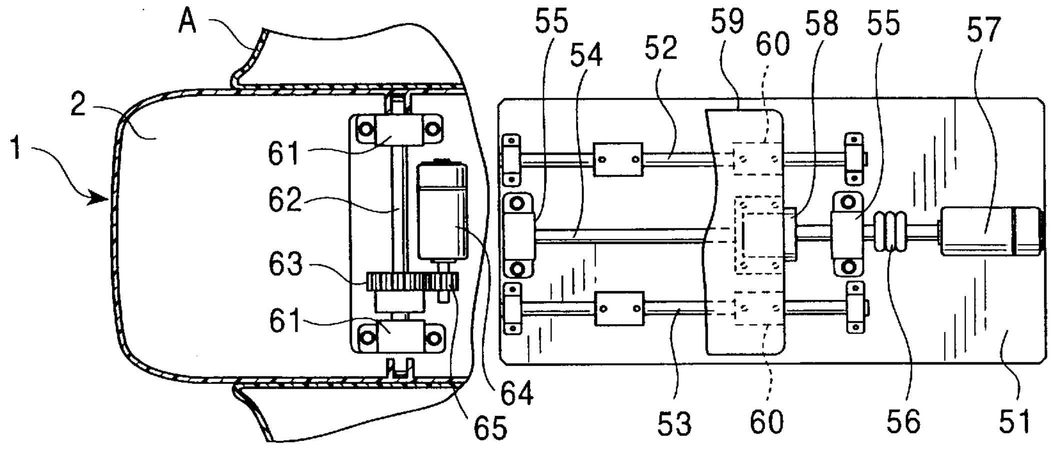
FIG. 12 is a partly broken plan view showing a mounting structure for mounting the car-mounted input device in the dashboard.
Figure 13:
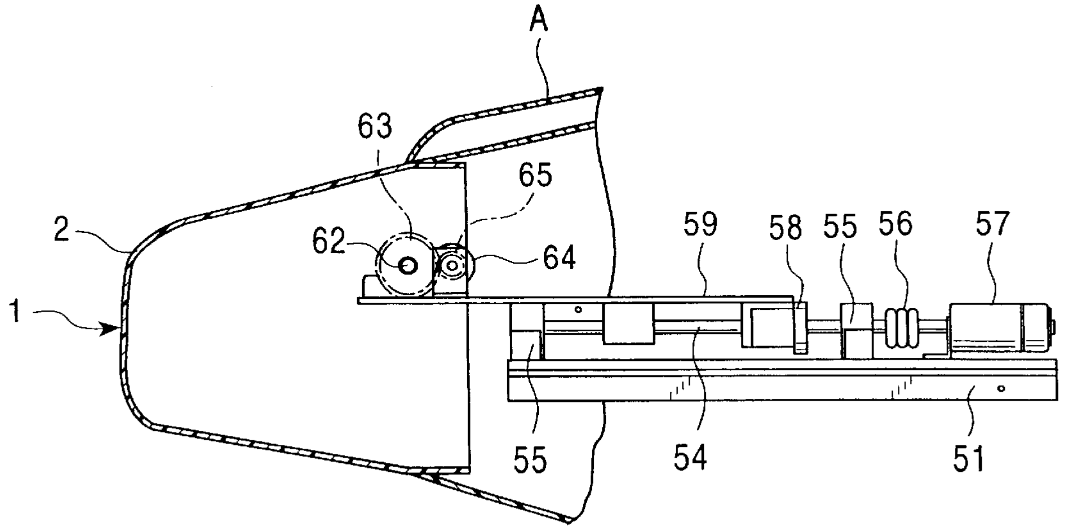
FIG. 13 is a partly broken side view of the mounting structure.

The car-mounted input device 1 of this embodiment with the above-described configuration is mounted in the dashboard A of the car so that it can move frontward and rearward and can tilt. FIG. 12 is a partly broken plan view showing a structure for mounting the car-mounted input device 1 in the dashboard A, and FIG. 13 is a partly broken side view of the structure.

As shown in these figures, two guide shafts 52 and 53 and a ball screw 54 are mounted in parallel on a base 51 provided inside the dashboard A. The ball screw 54 is rotatably supported by a bearing 55, and one end thereof is connected to a first motor 57 for forward and backward movement via a joint 56. Furthermore, a transfer plate 59 is attached to the ball screw 54 via a nut 58 so as to move forward and backward, and is also slidably attached to the guide shafts 52 and 53 via sliders 60. At the leading end of the transfer plate 59, a rotation shaft 62 is rotatably supported by bearings 61 so as to be perpendicular to the guide shafts 52 and 53 and the ball screw 54. The ends of the rotation shaft 62 is attached to the housing 2 of the car-mounted input device 1. A wheel 63 is fixedly mounted on the rotation shaft 62, and is meshed with a pinion 65 mounted on the main shaft of a second motor 64.

Accordingly, the car-mounted input device 1 can be moved forward and backward with respect to the dashboard A by driving the first motor 57 forward and in reverse, and the leading end thereof can be turned upward and downward with respect to the dashboard A by driving the second motor 64 forward and in reverse. The position of the car-mounted input device 1 can be appropriately changed so that the operator can easily operate the manual operating section 3, the various pushbutton switches 4*a* to 4*f* and 5*a* to 5*c*, the volume control knob 6, and the like, and this further improves operability of the car-mounted input device 1.

Figure 14:
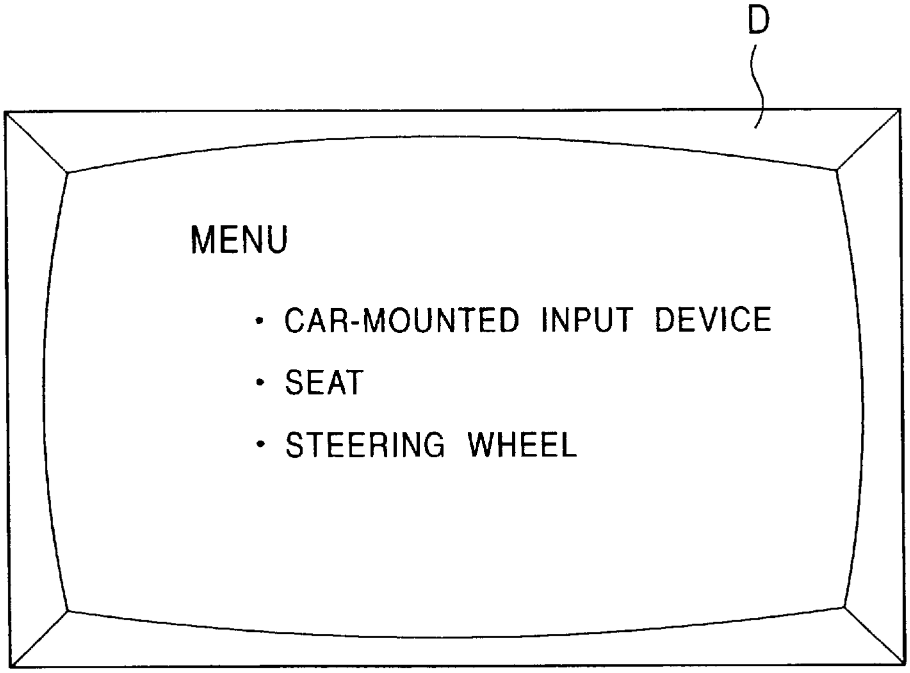
FIG. 14 is an explanatory view showing an example of a menu of car-mounted electrical devices to be displayed on a display device.
Figure 15:
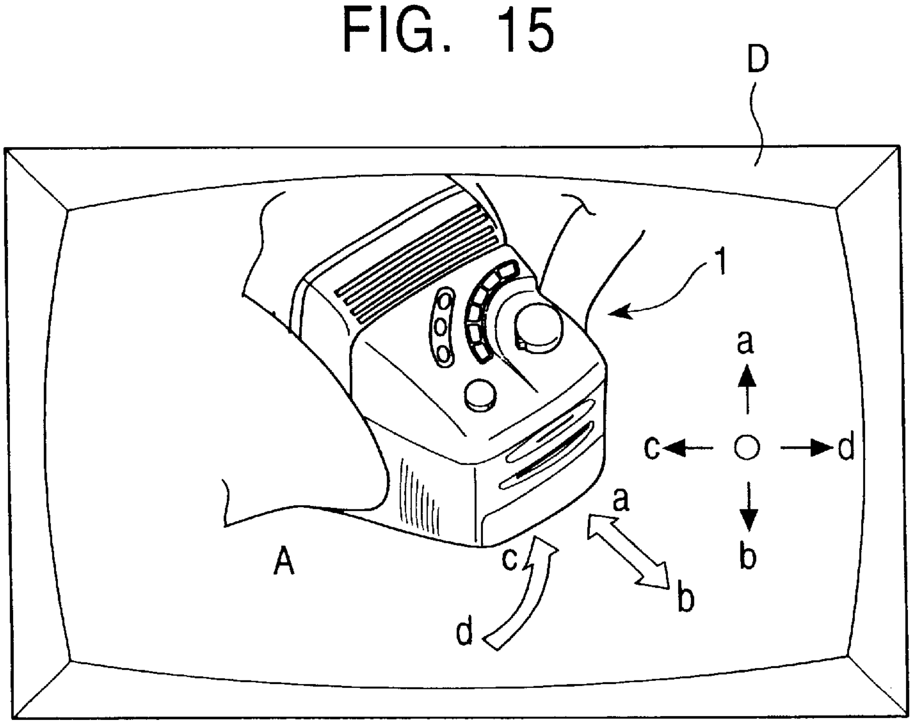
FIG. 15 is an explanatory view illustrating a state of a car-mounted electrical device to be displayed on the display device in which the function of the car-mounted electrical device is being adjusted.

The position of the car-mounted input device 1 can also be controlled by operating the manual operating section 3, the pushbutton switches 4*a* to 4*f* and 5*a* to 5*c* mounted therein. That is, when the pushbutton switch 4*a* is depressed, a menu illustrated in FIG. 14 appears on the display device D. When the operator selects "car-mounted input device" from the menu by operating the manual operating section 3, an image of the car-mounted input device 1 appears on the display device D, as shown in FIG. 15. When the manual operating section 3 is operated in a forward direction "a" in this state, the first motor 57 is rotated forward so as to move the car-mounted input device 1 forward. When the manual operating section 3 is operated in a backward direction "b", the first motor 57 is rotated in reverse so as to move the car-mounted input device 1 rearward. When the manual operating section 3 is operated in an upward direction "c", the second motor 64 is rotated forward so as to turn the leading end of the car-mounted input device 1 upward on the rotation shaft 62. When the manual operating section 3 is operated in a downward direction "d", the second motor 64 is rotated in reverse so as to turn the leading end of the car-mounted input device 1 downward on the rotation shaft 62. When "seat" is selected from the menu screen, the comfort of the driver's seat or the passenger's seat can be adjusted in a similar procedure. When "steering wheel" is selected from the menu screen, the tilting angle, telescoped state, and height of the steering wheel can be adjusted in a similar procedure.

When changing the position of the car-mounted input device 1, the seat, or the steering wheel by operating the manual operating section 3, it is preferable to set the table so that the allowable range of movement of the device and the resistance given to the manual operating section 3 are linked, and more preferably, for example, so that the resistance applied to the manual operating section 3 be gradually increased toward the end of the allowable range of movement of the device, or so that a shocking resistance be applied to the manual operating section 3 at the end of the allowable range of movement. Since this allows the operator to recognize to what degree the device has been adjusted, more convenient use of the device is possible.

In the car-mounted input device 1 of this embodiment, a desired car-mounted electrical device, whose function is to be adjusted, can be thus selected by operating the pushbutton switches 4*a* to 4*f* and 5*a* to 5*c* on the upper surface of the housing 2 or the manual operating section 3. Furthermore, after the desired car-mounted electrical device is selected, the function thereof can be adjusted by operating the manual operating section 3 in a predetermined direction or by operating the first or second switch 34 or 35 in the manual operating section 3. The volumes of the radio, the television, the CD player, and the like can also be controlled by turning the volume control knob 6. The menu of car-mounted electrical devices to be selected and the menu of the functions of electrical devices to be adjusted by the car-mounted input device 1, the operating directions of the manual operating section 3, and the like are sequentially displayed on the display device D. In a non-operation state of the manual operating section 3, the control shaft 14 is clamped by the clamping member 16, thereby preventing undesirable vibration and noise of the manual operating section 3 due to vibration of the car. When the fingers are held above the manual operating section 3, light of a specific wavelength from the light-emitting device enters the photoreceptor in the photo-interrupter 33, the solenoid 15 is activated, the clamping member 16 and the control shaft 14 are disengaged, and the manual operating section 3 is automatically allowed to be operated.

While the gear mechanism is used as the power transmitting mechanism for transmitting the pivotal movement of the control shaft 14 to the encoders 21*a* and 21*b* in the above first embodiment, the present invention is not limited thereto, and arbitrary known power transmitting mechanisms, such as a friction gear and a belt mechanism, may be used.

While the encoders 21*a* and 21*b* are used as sensors for detecting the direction and amount of pivotal movement of the control shaft 14 in the first embodiment, the present invention is not limited thereto, and other arbitrary known position sensors may be used.

While the solenoid 15 is used as the means for driving the clamping member 16 in the first embodiment, the present invention is not limited thereto, and other means, such as an electromagnet, and a hydraulic or air actuator, may be used.

While the manual operating section 3 can be operated in multiple directions by using the two electric motors 19*a* and 19*b* and the two encoders 21*a* and 21*b* in the first embodiment, it may be operated in a specific direction by using a single electric motor and a single encoder.

Figure 16:
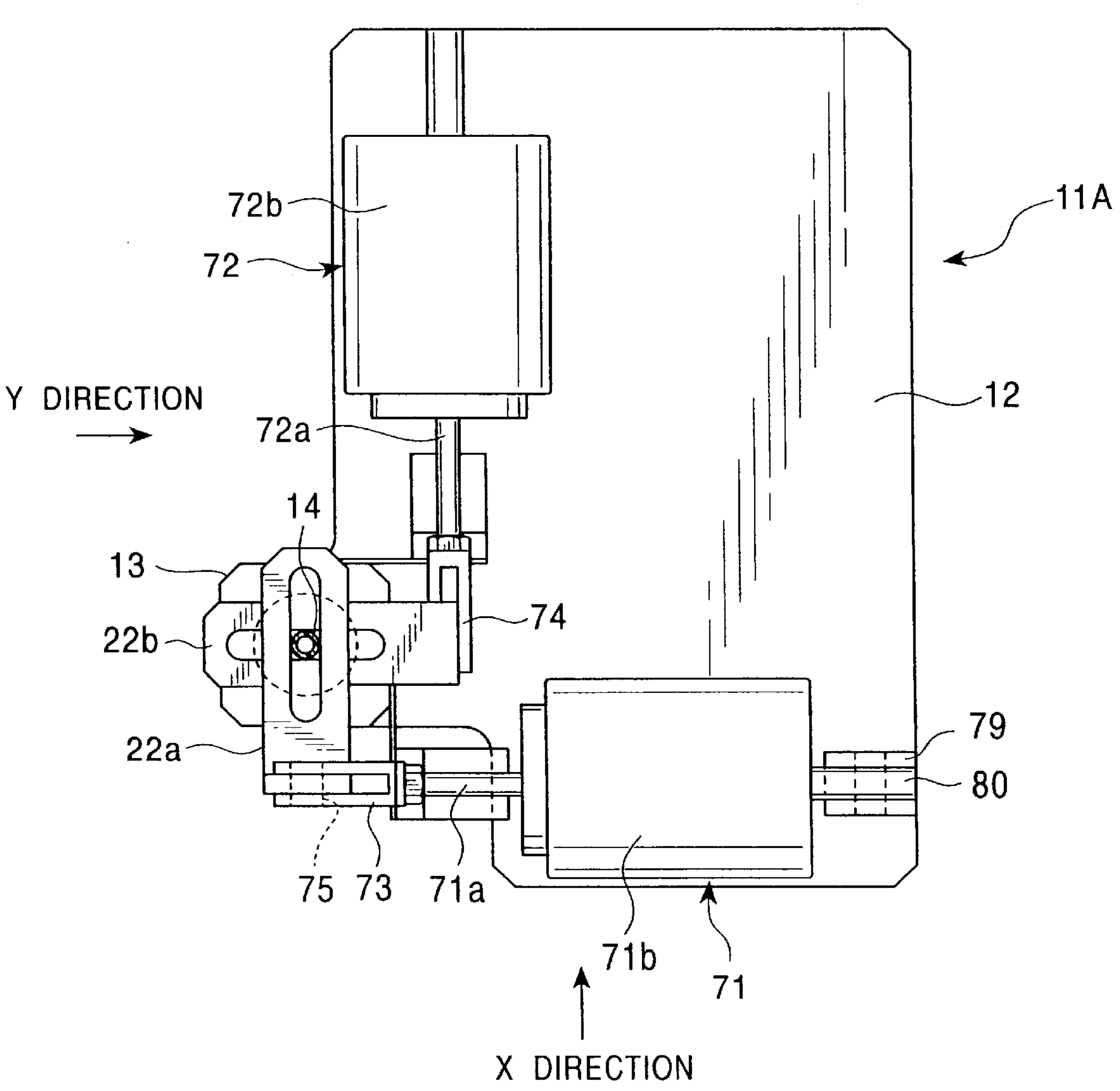
FIG. 16 is a plan view of a mechanism section provided in a car-mounted input device according to a second embodiment of the present invention.
Figure 17:
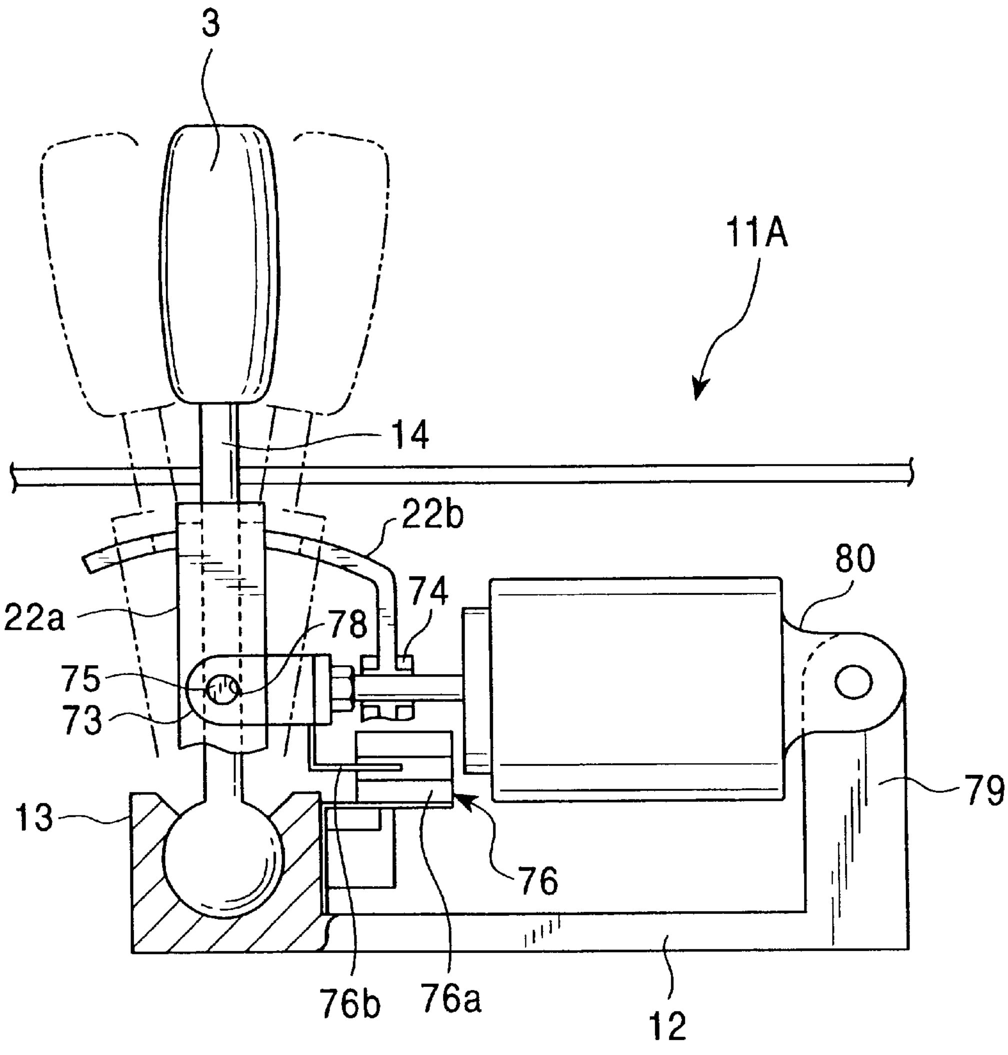
FIG. 17 is a side view of the mechanism section, as viewed from the X-direction.
Figure 18:
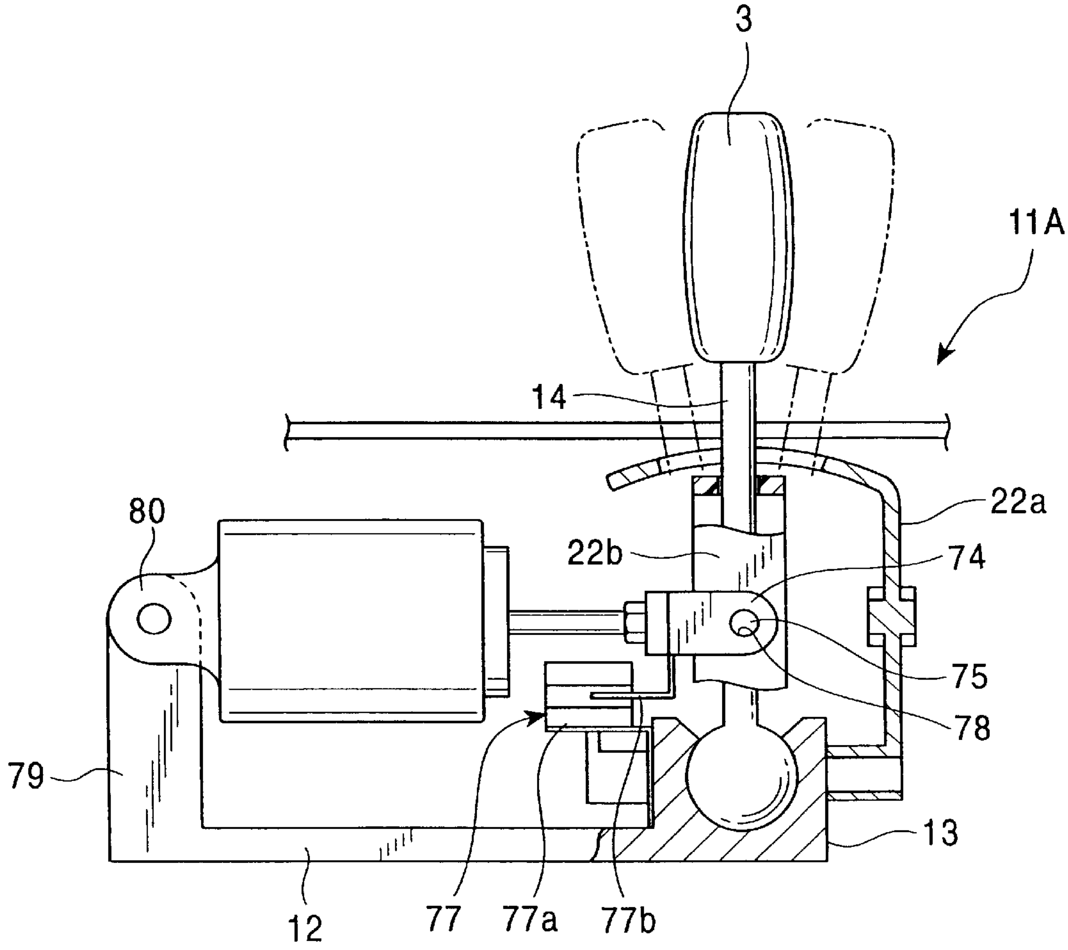
FIG. 18 is a side view of the mechanism section, as viewed from the Y-direction.

A car-mounted input device according to a second embodiment of the present invention will be described below with reference to FIGS. 16 to 18. The car-mounted input device of this embodiment is characterized in that a mechanism section 11A has voice coil motors as actuators for applying external force to a control shaft 14. FIG. 16 is a partly sectional plan view of the mechanism section 11A in this embodiment, FIG. 17 is a partly sectional side view of the mechanism section 11A, as viewed from the X-direction, and FIG. 18 is a partly sectional side view of the mechanism section 11A, as viewed from the Y-direction.

As shown in these figures, the mechanism section 11A of this embodiment comprises a base 12, a spherical bearing 13 formed on the base 12, a control shaft 14 having at the bottom a spherical portion 14*a* that is rotatably supported by the spherical bearing 13, two L-shaped members 22*a* and 22*b* attached to the control shaft 14 so as to be placed in intersecting directions, two voice coil motors 71 and 72 placed on the axes intersecting in a plane in parallel with the base 12 centered on the spherical bearing 13, two brackets 73 and 74 fixed to movable portions 71*a* and 72*a* of the voice coil motors 71 and 72, connecting pins 75 for rotatably pin-connecting the brackets 73 and 74 and the L-shaped members 22*a* and 22*b*, and two position sensors 76 and 77 for detecting the amounts and directions of movements of the brackets 73 and 74. A manual operating section 3 is mounted at the upper end of the control shaft 14.

One side of each of the L-shaped members 22*a* and 22*b* and the leading ends of the brackets 73 and 74 are provided with pin insertion holes 78 for inserting the connecting pins 75 therein. The L-shaped member 22*a* and the bracket 73 can be turnably linked by aligning the pin insertion hole 78 of the L-shaped member 22*a* and the pin insertion hole 78 of the bracket 73 and passing the connecting pin 75 through the pin insertion holes 78. Similarly, the L-shaped member 22*b* and the bracket 74 can be turnably linked by aligning the pin insertion hole 78 of the L-shaped member 22*b* and the pin insertion hole 78 of the bracket 74 and passing the connecting pin 75 through the pin insertion holes 78.

The other side of each of the L-shaped members 22*a* and 22*b* has a control shaft penetrating slot 24 for passing the control shaft 14 therethrough. In order to reduce backlash produced between the control shaft penetrating slot 24 and the control shaft 14, the width of the control shaft penetrating slot 24 is set so as to be as close to the diameter of the control shaft 14 as possible and so as to allow the control shaft 14 to smoothly slide. The length of the control shaft penetrating slot 24 is set to be equal to or more than the moving range of the control shaft 14.

The voice coil motors 71 and 72 are respectively composed of the movable portions 71*a* and 72*a* to which the brackets 73 and 74 are attached, and fixed portions 71*b* and 72*b* from which the movable portions 71*a* and 72*a* move in and out. The rear ends of the fixed portions 71*b* and 72*b* are turnably mounted on brackets 79 formed on the base 12 via universal joints 80. Therefore, external force in the X-direction can be applied to the control shaft 14 via the bracket 73 and the L-shaped member 22*a* by driving the voice coil motor 71, regardless of the operating position of the control shaft 14, and external force in the Y-direction can be applied to the control shaft 14 via the bracket 74 and the L-shaped member 22*b* by driving the voice coil motor 72. Of course, external force in the direction and with the amount in accordance with the outputs from the voice coil motors 71 and 72 can be applied to the control shaft 14 by simultaneously driving the voice coil motors 71 and 72. This makes it possible to give resistance and acceleration to the operation of the manual operating section 3, for example, to regulate the operating direction of the manual operating section 3, to adjust the operating speed in accordance with the amount of operation of the manual operating section 3, and to regulate the stop point of the manual operating section 3.

Position sensors 76 and 77 are respectively composed of detector bodies 76*a* and 77*a*, and movable members 76*b* and 77*b* inserted in the detector bodies 76*a* and 77*a*. The movable members 76*b* and 77*b* are fixed to the brackets 73 and 74 at one end. As the position sensors 76 and 77, known types of optical, magnetic, and resistive sensors, such as a photo-interrupter and a variable resistor, may be used, which can output signals in accordance with the direction and amount of the pivotal movement of the control shaft 14 from the neutral position.

As shown in FIGS. 17 and 18, the manual operating section 3 is shaped like a knob, and may have therein a circuit substrate 32, a photo-interrupter 33, and first and second switches 34 and 35 (see FIG. 4), in a manner similar to the manual operating section 3 of the first embodiment.

Since other structures are the same as those in the above-described car-mounted input device of the first embodiment, a description thereof is omitted to avoid repeated explanation.

The car-mounted input device of this embodiment provides the advantages similar to those of the car-mounted input device of the first embodiment. In addition, since the car-mounted input device of this embodiment adopts the voice coil motors 71 and 72 as actuators for applying external force to the control shaft 14, the gear mechanism is unnecessary and the size and cost of the device can be reduced. The use of the voice coil motors 71 and 72 instead of the gear mechanism also facilitates controlling of vibration to be applied to the control shaft 14, and a predetermined resistance can be more clearly given to the operator. This makes it possible to prevent errors in selection of the car-mounted electrical device and in adjustment of the function thereof, and to facilitate fine adjustment of the function of the car-mounted electrical device.

Figure 19:
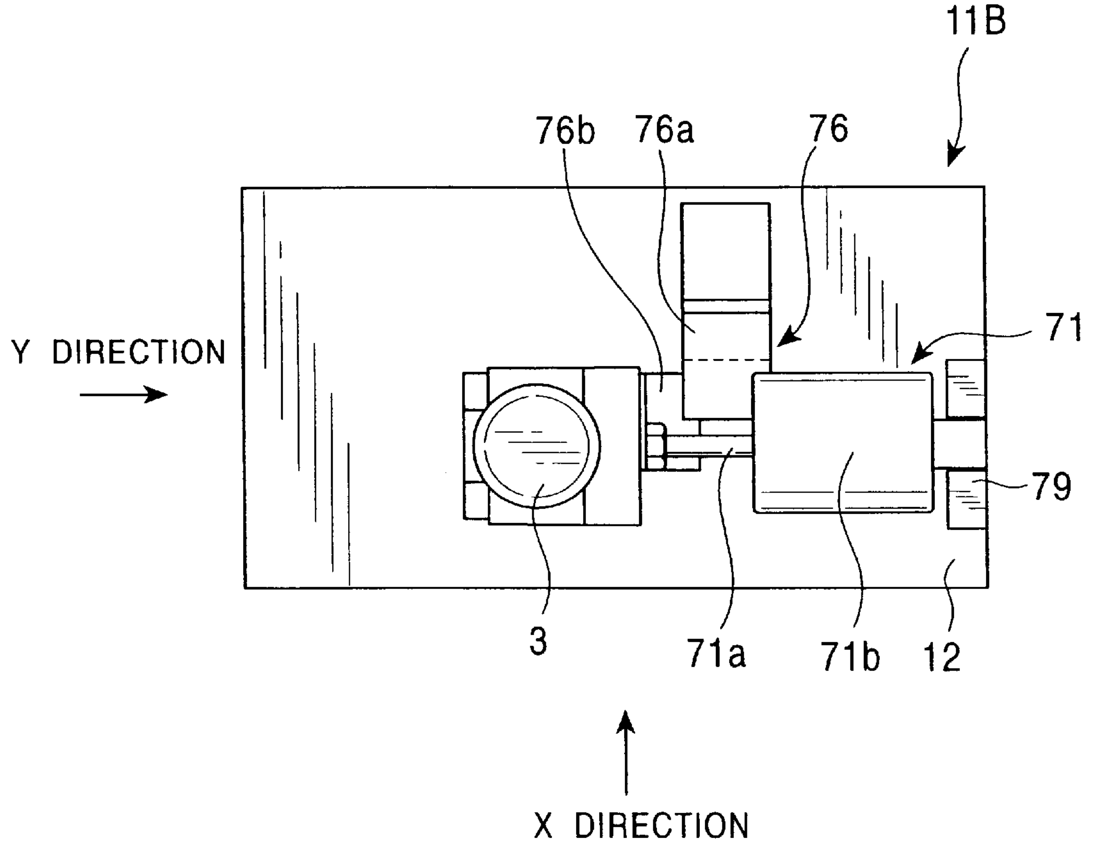
FIG. 19 is a plan view of a mechanism section provided in a car-mounted input device according to a third embodiment of the present invention.
Figure 20:
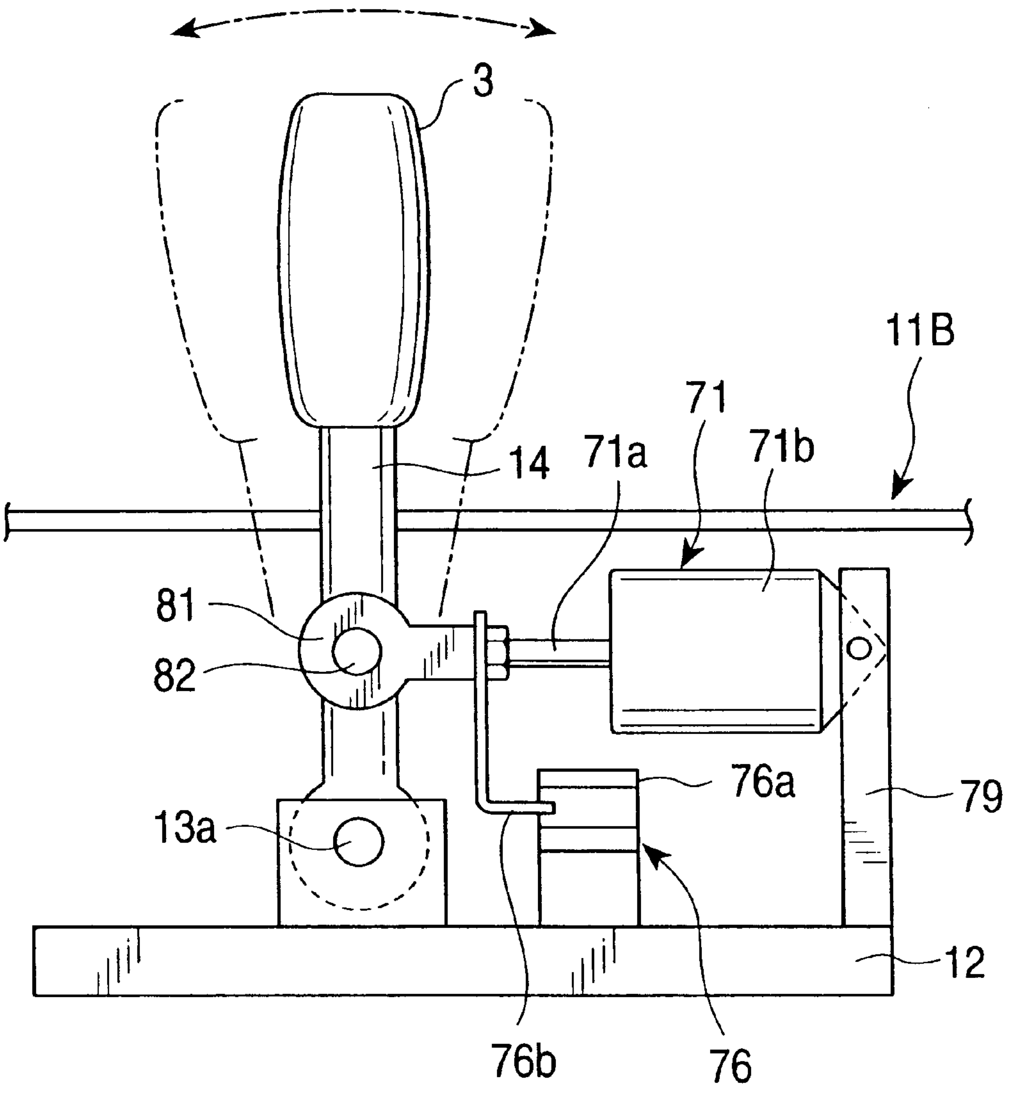
FIG. 20 is a side view of the mechanism section, as viewed from the X-direction.
Figure 21:
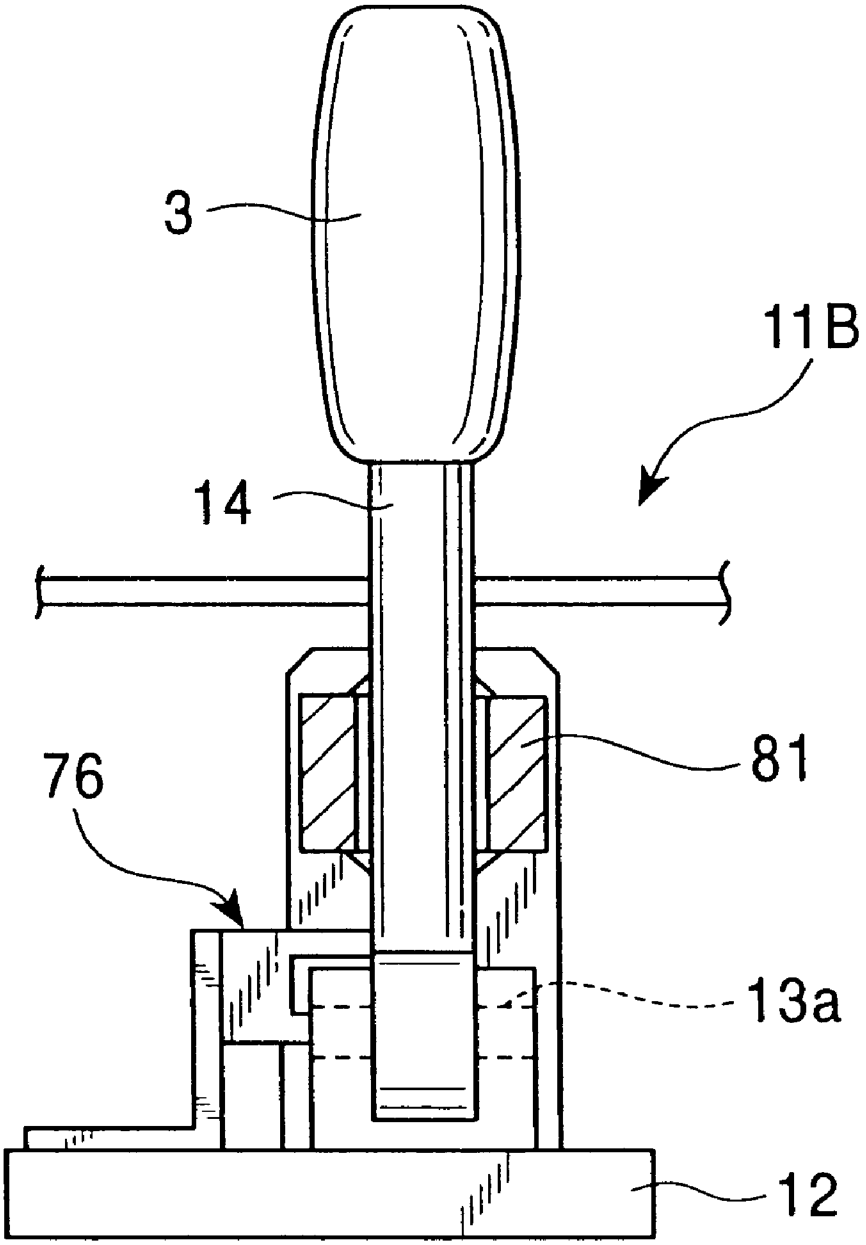
FIG. 21 is a side view of the mechanism section, as viewed from the Y-direction.

A car-mounted input device according to a third embodiment of the present invention will be described with reference to FIGS. 19 to 21. The car-mounted input device of this embodiment is characterized in that a mechanism section 11B has a voice coil motor serving as an actuator for applying external force to a control shaft 14 and in that the control shaft 14 can pivot only in a specific direction. FIG. 19 is a plan view of the mechanism section 11B of this embodiment, FIG. 20 is a side view of the mechanism section 11B, as viewed from the X-direction, and FIG. 21 is a partly sectional side view of the mechanism section 11B, as viewed from the Y-direction.

As shown in these figures, the mechanism section 11B of this embodiment comprises a base 12, a spherical bearing 13 formed on the base 12, a control shaft 14 having at its bottom end a spherical portion 14*a* that is rotatably supported by the spherical bearing 13, a voice coil motor 71 placed on the axis centered on the spherical bearing 13, a link member 81 fixed to a movable portion 71*a* of the voice coil motor 71, a connecting pin 82 for rotatably pin-connecting the link member 81 and the control shaft 14, and a position sensor 76 for detecting the amount and direction of pivotal movement of the control shaft 14. A manual operating section 3 is mounted at the upper end of the control shaft 14.

The voice coil motor 71 is composed of the movable portion 71*a* to which the link member 81 is attached, and a fixed portion 71*b* from which the movable portion 71*a* moves in and out. The rear end of the fixed portion 71*b* is pivotally mounted to a bracket 79 formed on the base 12. The voice coil motor 71 of this embodiment also serves to give resistance to the operation of the manual operating section 3, and is used, for example, to regulate the operating direction of the manual operating section 3, to adjust the operating speed in accordance with the amount of operation of the manual operating section 3, and to regulate the stop point of the manual operating section 3. The position sensor 76 is composed of a detector body 76*a* and a movable member 76*b* inserted in the detector body 76*a*. The movable member 76*b* is attached to the link member 81 at one end.

Other structures are the same as those of the car-mounted input device of the second embodiment, and therefore, a description thereof is omitted in order to avoid repeated explanation. The car-mounted input device of this embodiment also provides the advantages similar to those of the car-mounted input device of the second embodiment.

Figure 22:
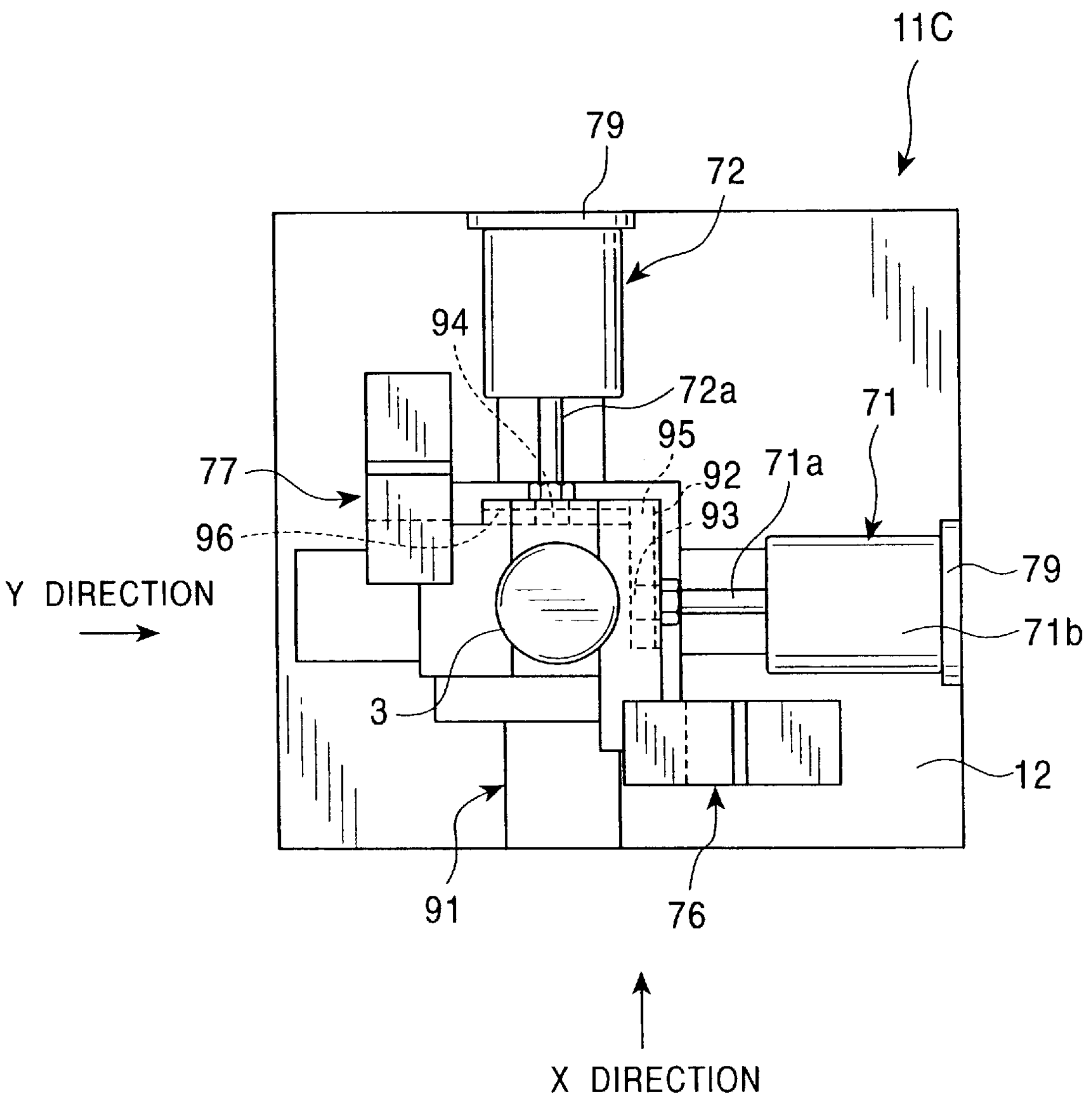
FIG. 22 is a plan view of a mechanism section provided in a car-mounted input device according to a fourth embodiment of the present invention.
Figure 23:
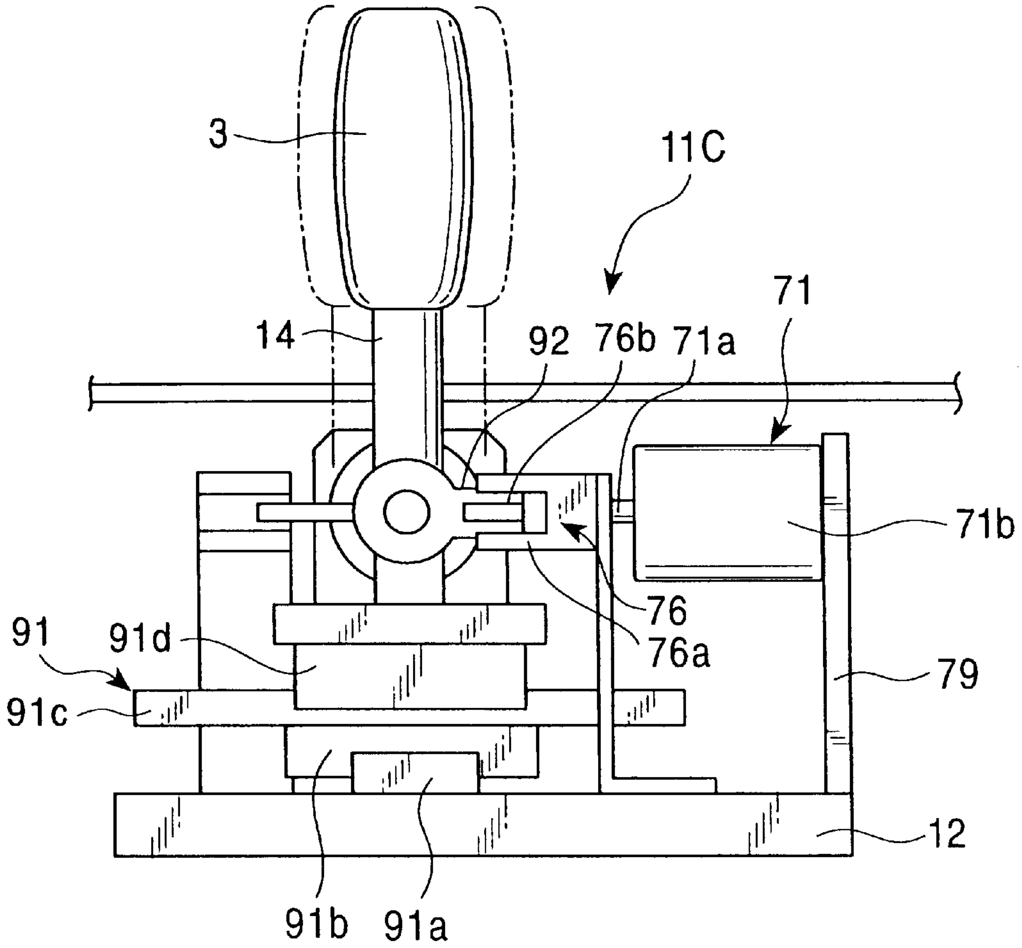
FIG. 23 is a side view of the mechanism section, as viewed from the X-direction.
Figure 24:
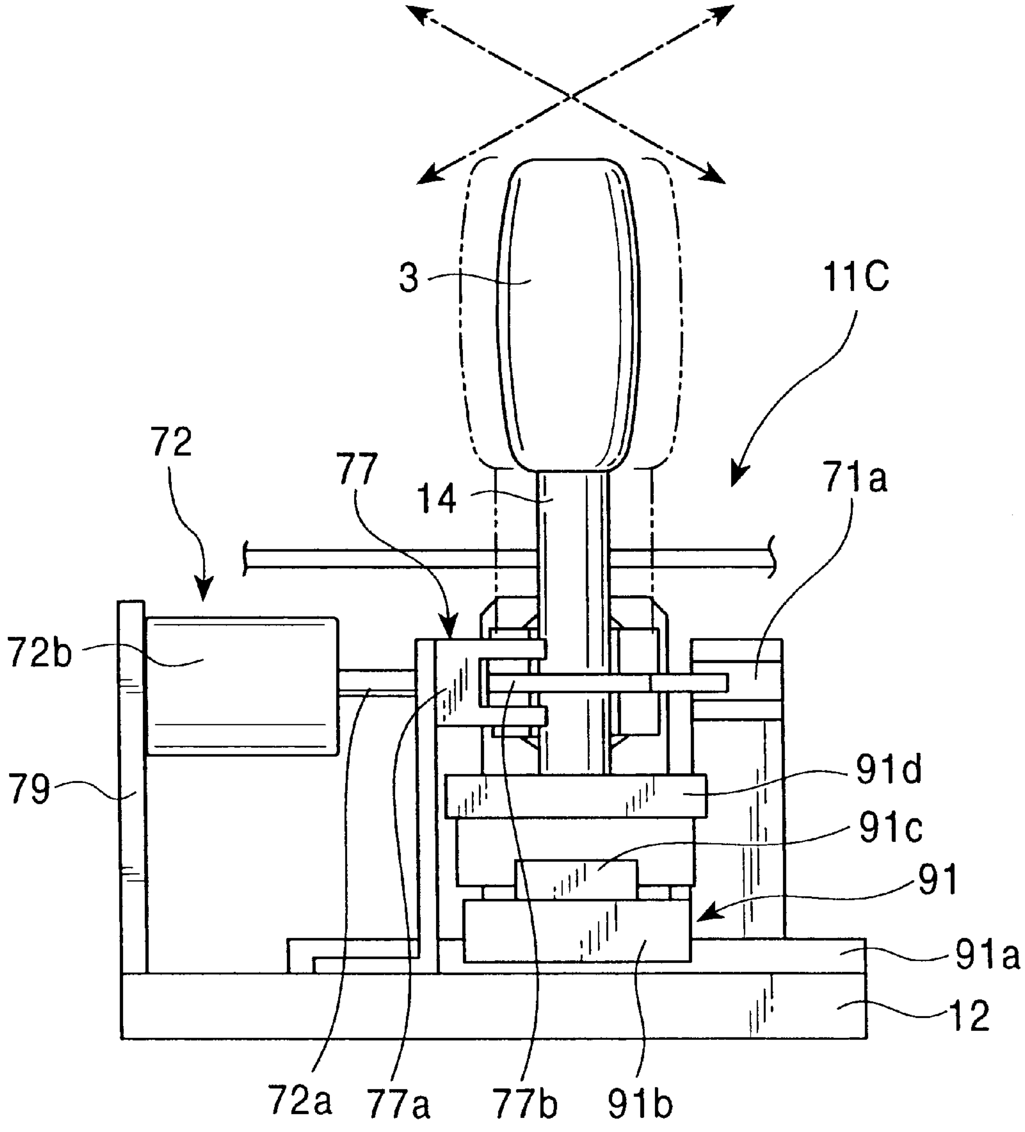
FIG. 24 is a side view of the mechanism section, as viewed from the Y-direction.

A car-mounted input device according to a fourth embodiment of the present invention will be described below with reference to FIGS. 22 to 24. The car-mounted input device of this embodiment is characterized in that a mechanism section 11C has voice coil motors serving as actuators for applying external force to a control shaft 14 and in that the control shaft 14 moves in parallel with the base 12. FIG. 22 is a plan view of the mechanism section 11C of this embodiment, FIG. 23 is a partly sectional side view of the mechanism section 11C, as viewed from the X-direction, and FIG. 24 is a side view of the mechanism section 11C, as viewed from the Y-direction.

As shown in these figures, the mechanism section 11C of this embodiment comprises a base 12, an X-Y stage 91 mounted on the base 12, the control shaft 14 fixed to the X-Y stage 91, a bidirectional floating joint 92 formed in the control shaft 14, two voice coil motors 71 and 72 placed on the axes intersecting in a plane in parallel with the base 12 centered on the neutral position of the control shaft 14, two sliders 93 and 94 fixed to movable portions 71*a* and 72*a* of the voice coil motors 71 and 72 and slidably connected to the floating joint 92, and two position sensors 76 and 77 for detecting the amount and direction of movement of the control shaft 14. A manual operating section 3 is mounted at the upper end of the control shaft 14.

The X-Y stage 91 comprises an X-direction rail 91*a* extending in the X-direction of the base 12, an X-direction slider 91*b* slidably mounted on the X-direction rail 91*a*, a Y-direction rail 91*c* extending in the Y-direction of the base 12 and formed integrally with the X-direction slider 91*b*, and a Y-direction slider 91*d* slidably mounted on the Y-direction rail 91*c*. The control shaft 14 is vertically fixed on the upper surface of the Y-direction slider 91*d*. Therefore, the control shaft 14 is freed to horizontally move in a plane in parallel with the base 12 within an allowable range of movement of the X-Y stage 91.

The floating joint 92 is provided, at two intersecting sides, with two concave grooves 95 and 96 in which the sliders 93 and 94 fixed to the movable portions 71*a* and 72*a* of the voice coil motors 71 and 72 can slide, and is horizontally mounted on the control shaft 14. The slider 93 is placed inside the concave groove 95 so as to slide only in the Y-direction, and the slider 94 is placed inside the concave groove 96 so as to slide only in the X-direction. The voice coil motors 71 and 72 are respectively composed of the movable portions 71*a* and 72*a* to which the sliders 93 and 94 are attached, and fixed portions 71*b* and 72*b* from which the movable portions 71*a* and 72*a* move in and out. The rear ends of the fixed portions 71*b* and 72*b* are fixed to brackets 79 formed on the base 12.

Accordingly, regardless of the position of the control shaft 14 on the X-Y stage 91, external force in the X-direction can be applied to the control shaft 14 via the slider 93 and the floating joint 92 by driving the voice coil motor 71, and external force in the Y-direction can be applied to the control shaft 14 via the slider 94 and the floating joint 92 by driving the voice coil motor 72. Of course, external force in the direction and of the size in accordance with the outputs from the voice coil motors 71 and 72 can be applied to the control shaft 14 by simultaneously driving the voice coil motors 71 and 72. This makes it possible to give resistance to the operation of the manual operating section 3, and to thereby perform, for example, regulation of the operating direction of the manual operating section 3, adjustment of the operating speed in accordance with the amount of operation of the manual operating section 3, and regulation of the stop point of the manual operating section 3.

The position sensors 76 and 77 are respectively composed of detector bodies 76*a* and 77*a*, and movable members 76*b* and 77*b* inserted in the detector bodies 76*a* and 77*a*. The movable members 76*b* and 77*b* are formed integrally with the floating joint 92.

Other structures are the same as those of the car-mounted input device of the second embodiment, and therefore, a description thereof is omitted in order to avoid repeated explanation. The car-mounted input device of this embodiment also provides the advantages similar to those of the car-mounted input device of the second embodiment.

Figure 25:
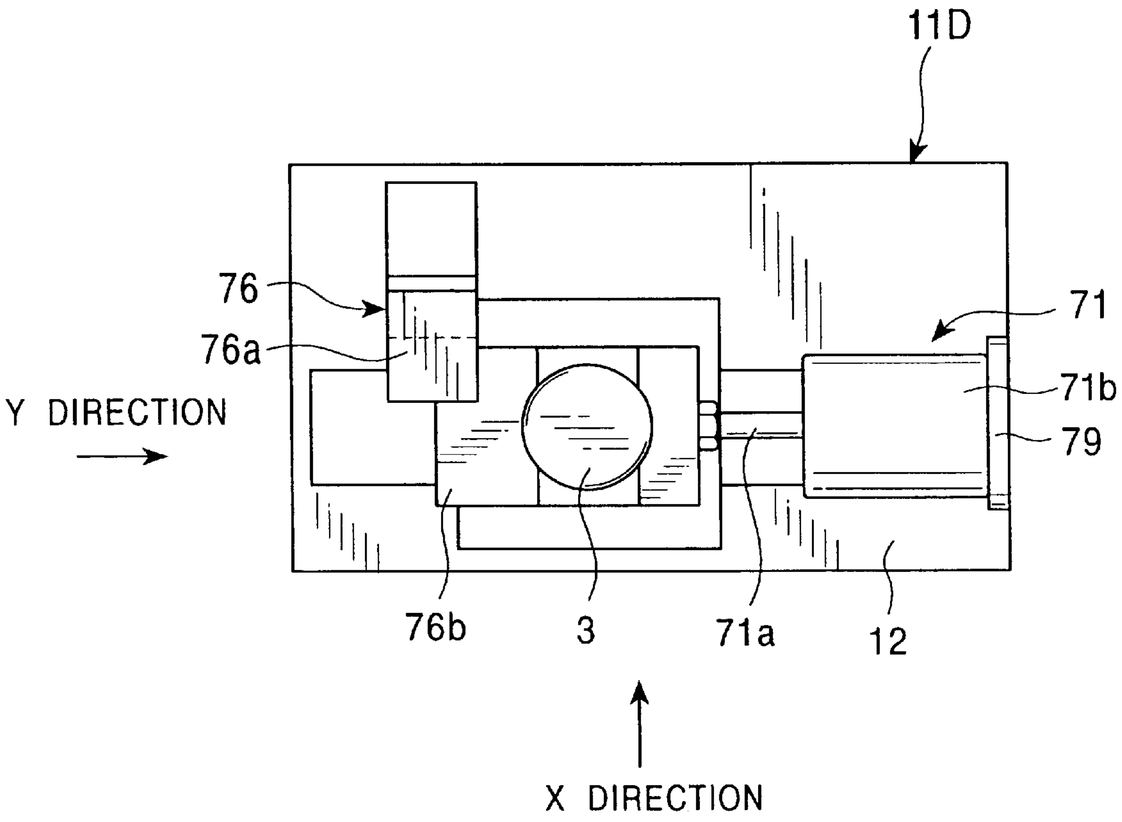
FIG. 25 is a plan view of a mechanism section provided in a car-mounted input device according to a fifth embodiment of the present invention.
Figure 26:
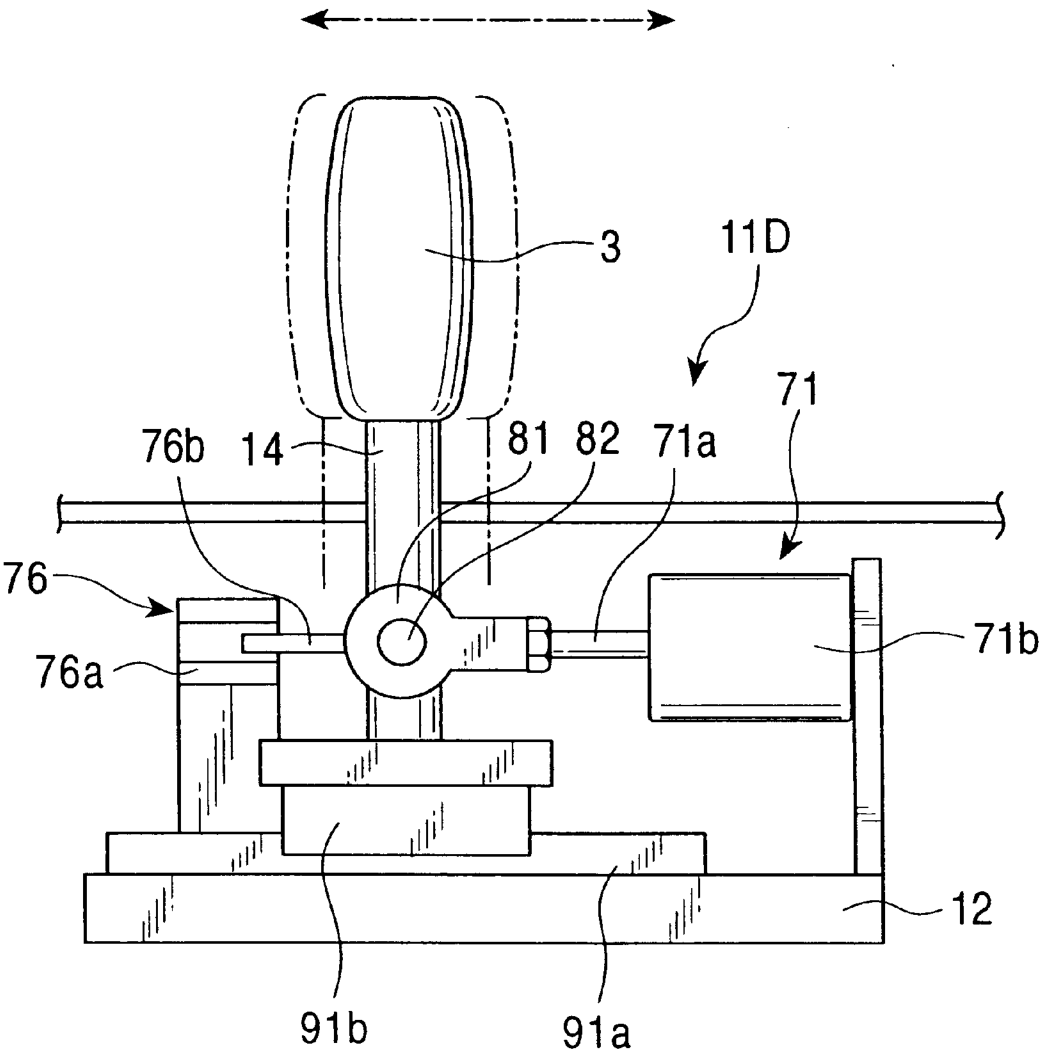
FIG. 26 is a side view of the mechanism section, as viewed from the X-direction.
Figure 27:
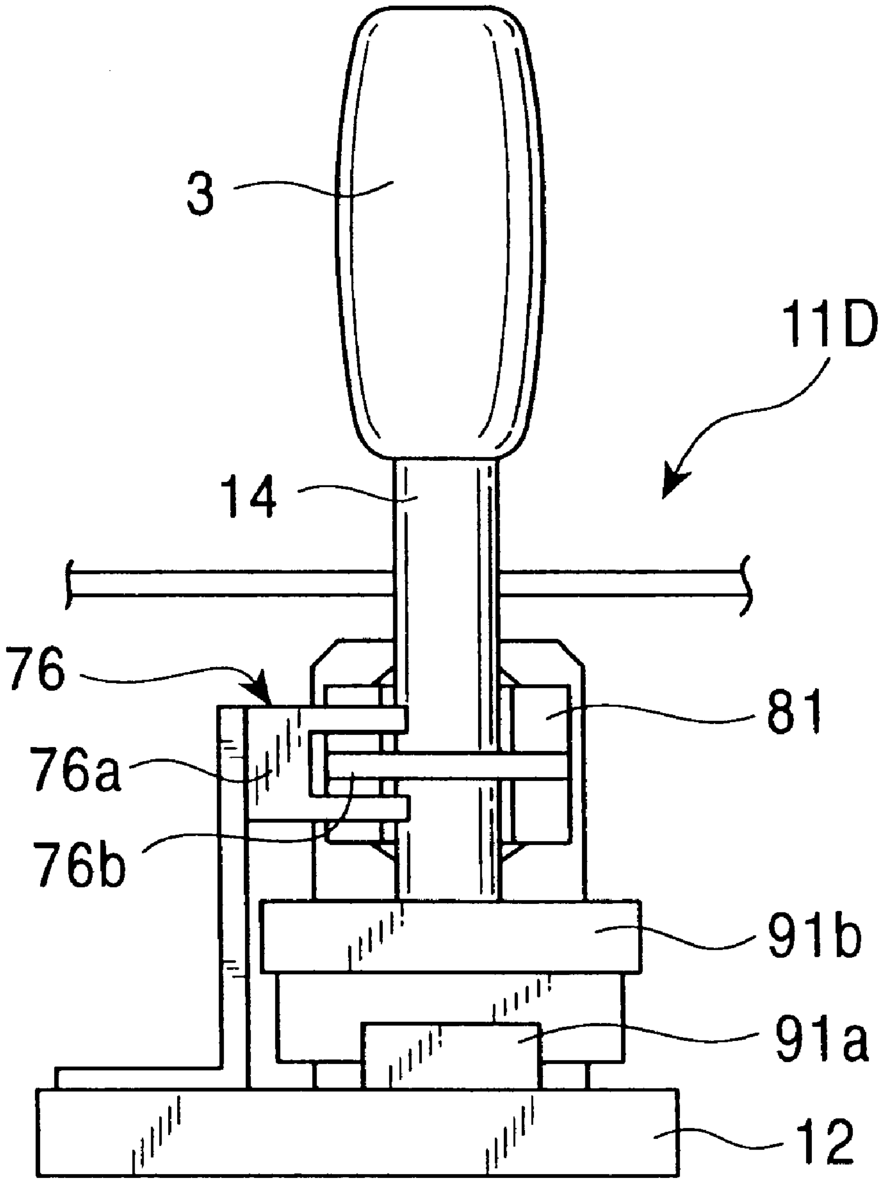
FIG. 27 is a side view of the mechanism section, as viewed from the Y-direction.
Figure 28:
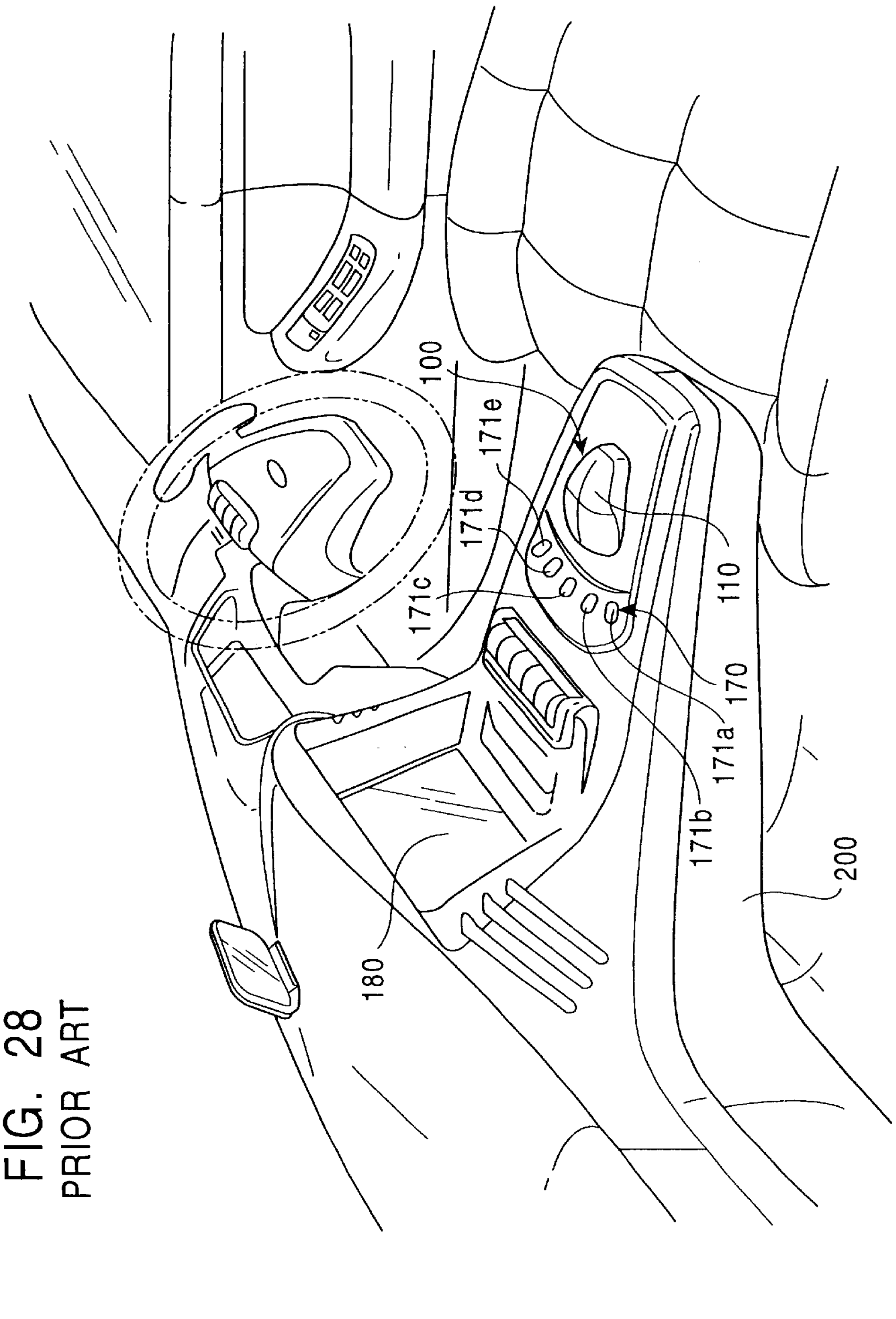
FIG. 28 PRIOR ART
FIG. 28 is an interior view of a car showing an example of a state in which a conventional car-mounted input device is installed.
Figure 29:
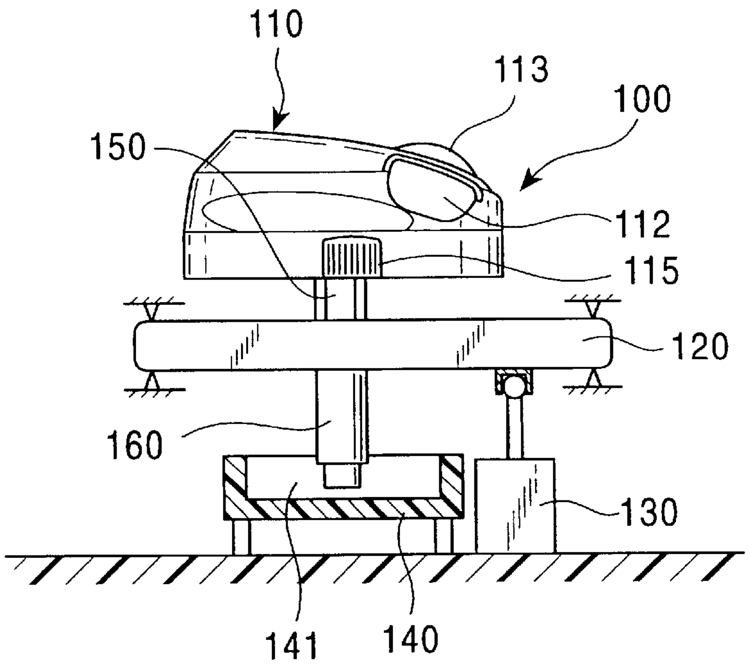
FIG. 29 PRIOR ART
FIG. 29 is a side view of the conventional car-mounted input device.
Figure 30:
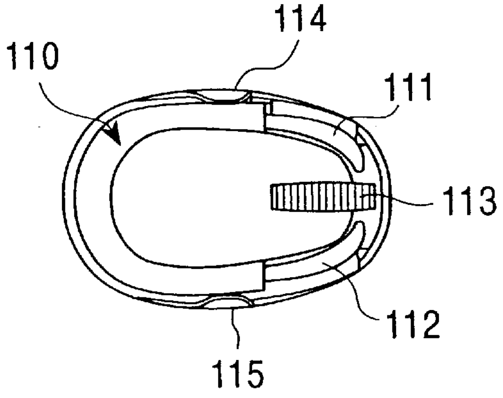
FIG. 30 PRIOR ART
FIG. 30 is a plan view of a manual operating section in the conventional car-mounted input device shown in FIG. 29.
Figure 31:
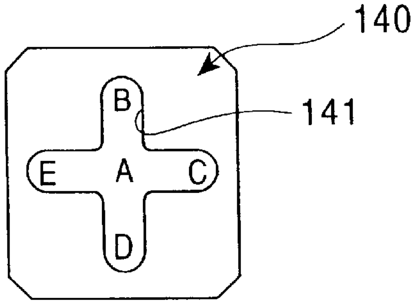
FIG. 31 PRIOR ART
FIG. 31 is a plan view of a guide plate incorporated in the conventional car-mounted input device shown in FIG. 29.

A car-mounted input device according to a fifth embodiment of the present invention will be described below with reference to FIGS. 25 to 27. The car-mounted input device of this embodiment is characterized in that a mechanism section 11D has a voice coil motor serving as an actuator for applying external force to a control shaft 14, in that the control shaft 14 moves in parallel with the base 12, and in that the control shaft 14 pivots only in a specific direction. FIG. 25 is a plan view of the mechanism section 11D of this embodiment, FIG. 26 is a side view of the mechanism section 11D, as viewed from the X-direction, and FIG. 27 is a partly sectional side view of the mechanism section 11D, as viewed from the Y-direction.

As shown in these figures, the mechanism section 11D of this embodiment comprises a base 12, an X-direction rail 91*a* formed on the base 12, an X-direction slider 91*b* slidably mounted on the X-direction rail 91*a*, a voice coil motor 71 placed on the axis of the X-direction rail 91*a*, a link member 81 fixed to a movable portion 71*a* of the voice coil motor 71, a connecting pin 82 for rotatably pin-connecting the link member 81 and the control shaft 14, and a position sensor 76 for detecting the amount and direction of pivotal movement of the control shaft 14. A manual operating section 3 is mounted at the upper end of the control shaft 14.

The voice coil motor 71 is composed of the movable portion 71*a* to which the link member 81 is attached, and a fixed portion 71*b* from which the movable portion 71*a* moves in and out. The rear end of the fixed portion 71*b* is fixed to a bracket 79 formed on the base 12. The voice coil motor 71 of this embodiment also serves to give resistance to the operation of the manual operating section 3, and is used, for example, to regulate the operating direction of the manual operating section 3, to adjust the operating speed in accordance with the amount of operation of the manual operating section 3, and to regulate the stop point of the manual operating section 3. The position sensor 76 is composed of a detector body 76*a* and a movable member 76*b* inserted in the detector body 76*a*. The movable member 76*b* is attached to the control shaft 14.

Other structures are the same as those of the car-mounted input device of the third embodiment, and therefore, a description thereof is omitted in order to avoid repeated explanation. The car-mounted input device of this embodiment also provides the advantages similar to those of the car-mounted input device of the third embodiment.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A car-mounted input device comprising:

a display device;

a manual operating section;

a pivotably mounted control shaft connected with said manual operating section, the control shaft operable in a plurality of operating directions to select a car mounted electrical device;

an actuator to apply an external force in the operating direction to said control shaft, wherein, when said manual operating section is operated in a direction outside a predetermined allowable range of movement, external force preset in accordance with an amount of operation of said manual operating section is applied by said actuator to said control shaft;

a position sensor to output a position signal in accordance with the operating direction and the amount of operation of the manual operating section;

said position sensor being electrically connected to said display device such that said display device displays the type of car mounted electrical display device that has been selected and details for operating the selected car mounted electrical device.

2. A car-mounted input device according to claim 1, said actuator including a voice coil motor.

3. A car-mounted input device according to claim 1, said control shaft being pivotally held by a bearing.

4. A car-mounted input device according to claim 3, said actuator including a voice coil motor.

5. A car-mounted input device according to claim 1, said control shaft being fixed to a slider to slide on a rail.

6. A car-mounted input device according to claim 5, said actuator including a voice coil motor.

7. A car-mounted input device according to claim 1, said manual operating section being reciprocally operated only in a specific direction.

8. A car-mounted input device according to claim 7, said actuator including a voice coil motor.

9. A car-mounted input device according to claim 1, said actuator including a voice coil motor.

10. A car-mounted input device according to claim 1, one of the external force applied by said actuator to said control shaft being sequentially increased and a mode of vibration applied to the control shaft being changed with an increase in amount of operation of said manual operating section.

11. A car-mounted input device according to claim 1, said actuator applying a shocking external force to said control shaft when said manual operating section is operated to a predetermined operation limit.

12. A car-mounted input device according to claim 1, said manual operating section being operated in an arbitrary direction in a specific plane.

13. A car-mounted input device according to claim 12, said actuator including a voice coil motor.

14. A car-mounted input device according to claim 1, said car-mounted electrical device being a tilting device and a telescoping device provided in a steering device to adjust a height of the steering device.

15. A car-mounted input device according to claim 1, said car-mounted electrical device being a seat adjusting device to control one of a position of the driver's seat and a passenger's seat.

16. A car-mounted input device comprising:

a display device;

a manual operating section;

a control shaft connected with said manual operating section, the control shaft operable in a plurality of operating directions to select a car mounted electrical device;

an actuator to apply an external force to said control shaft, wherein, when said manual operating section is operated in a direction outside a predetermined allowable range of movement, external force preset in accordance with the direction and amount of operation of said manual operating section is applied by said actuator to said control shaft; and a position sensor to output a position signal in accordance with the operating direction and amount of operation of the manual operating section;

said position sensor being electrically connected to said display device such that said display device displays the type of car mounted electrical device that has been selected and details for operating the selected car mounted electrical device.

17. A car-mounted input device according to claim 16, said actuator including a voice coil motor.

18. A car-mounted input device according to claim 16, said control shaft being pivotally held by a bearing.

19. A car-mounted input device according to claim 18, said actuator including a voice coil motor.

20. A car-mounted input device according to claim 16, said control shaft being fixed to a slider to slide on a rail.

21. A car-mounted input device according to claim 20, said actuator including a voice coil motor.

22. A car-mounted input device according to claim 16, said manual operating section being reciprocally operated only in a specific direction.

23. A car mounted input device according to claim 22, said actuator including a voice coil motor.

24. A car-mounted input device according to claim 16, said manual operating section being operated in an arbitrary direction in a specific plane.

25. A car-mounted input device according to claim 24, said actuator including a voice coil motor.

26. A car-mounted input device according to claim 16, one of the external force applied by said actuator to said control shaft being sequentially increased and a mode of vibration applied to the control shaft being changed with an increase in amount of operation of said manual operating section.

27. A car-mounted input device according to claim 26, said actuator including a voice coil motor.

28. A car-mounted input device according to claim 16, said actuator applying a shocking external force to said control shaft when said manual operating section is operated to a predetermined operation limit.

29. A car-mounted input device according to claim 28, said actuator including a voice coil motor.

30. A car-mounted input device according to claim 16, said car-mounted electrical device including a seat adjusting device to control one of a position of the driver's seat and a passenger's seat.

31. A car-mounted input device according to claim 16, said car-mounted electrical device including a tilting device and a telescoping device provided in a steering device to adjust a height of the steering device.

* * * * *